United States Patent [19]

Weiley

[11] Patent Number: 5,029,034
[45] Date of Patent: Jul. 2, 1991

[54] VIDEO CASSETTE WITH OPTICAL OUTPUT OF INFORMATION

[75] Inventor: John F. Weiley, Paddington, Australia

[73] Assignee: Capital Cities/ABC Video Systems, Inc., New York, N.Y.

[21] Appl. No.: 260,454

[22] Filed: Oct. 20, 1988

Related U.S. Application Data

[63] Continuation-in-part of Ser. No. 9,340, Apr. 21, 1986, abandoned, and a continuation-in-part of Ser. No. 117,813, Nov. 5, 1987, abandoned, and a continuation-in-part of Ser. No. 160,022, Feb. 24, 1988, abandoned.

[30] Foreign Application Priority Data

Apr. 21, 1986 [AU] Australia ............... 58665/86

[51] Int. Cl.$^5$ ........................... G11B 23/02
[52] U.S. Cl. ................. 360/132; 360/137
[58] Field of Search ............ 360/90, 92, 132, 137, 360/133; 186/35, 52, 59; 221/88, 195; 235/380, 381; 364/131, 188, 189, 401, 478, 479; 414/273; 379/91, 144

[56] References Cited

U.S. PATENT DOCUMENTS

| | | | |
|---|---|---|---|
| 3,934,123 | 1/1976 | Maurer | 377/38 |
| 4,338,644 | 7/1982 | Staar | 360/132 |
| 4,423,319 | 12/1983 | Jacobsen | 235/472 |
| 4,475,222 | 10/1984 | Egendorf | 360/132 |
| 4,554,443 | 11/1985 | Lambert et al. | 360/132 |
| 4,593,337 | 6/1986 | Leone et al. | 360/137 |
| 4,627,695 | 12/1986 | Beauviala et al. | 352/72 |
| 4,667,293 | 5/1987 | Krieger et al. | 364/409 |
| 4,692,746 | 9/1987 | Budin et al. | 340/572 |
| 4,713,841 | 12/1987 | Porter et al. | 455/608 |
| 4,736,096 | 4/1988 | Ushikubo | 235/472 |
| 4,743,984 | 5/1988 | Ryan | 360/60 |
| 4,916,296 | 4/1990 | Streck | 235/454 |

Primary Examiner—David J. Severin
Attorney, Agent, or Firm—Gregor N. Neff

[57] ABSTRACT

A computerized video record rental system and method in which a video record unit such as a tape cassette is provided with an integral counting device for counting the number of times the record is played. Upon rental and return of the record, the counts are recorded in computer memory, together with an identification of the record unit, and the computer computes the rental fee due based on the net play count for the record unit. The preferred counting device in the video cassette uses caliper arms to detect the position of one of the tape rolls in the cassette at two points on opposite sides of the roll and drives a counter in proportion to changes in the distance between the points. This virtually immunizes the mechanism from false counts due to lateral shifting of the tape reels in the cassette housing during handling of the cassette of a cassette playing machine. An alternative is a hybrid system using a mechanical tape motion sensor and an integral electronic counter and memory, with an LED read-out in a form which is readable by a bar-code scanner. An all-electrical counting and bar-code readout device also is disclosed. The latter device is contained entirely in one of the tape reels in the cassette, thus making the invention easily usable with existing cassette structures.

18 Claims, 14 Drawing Sheets

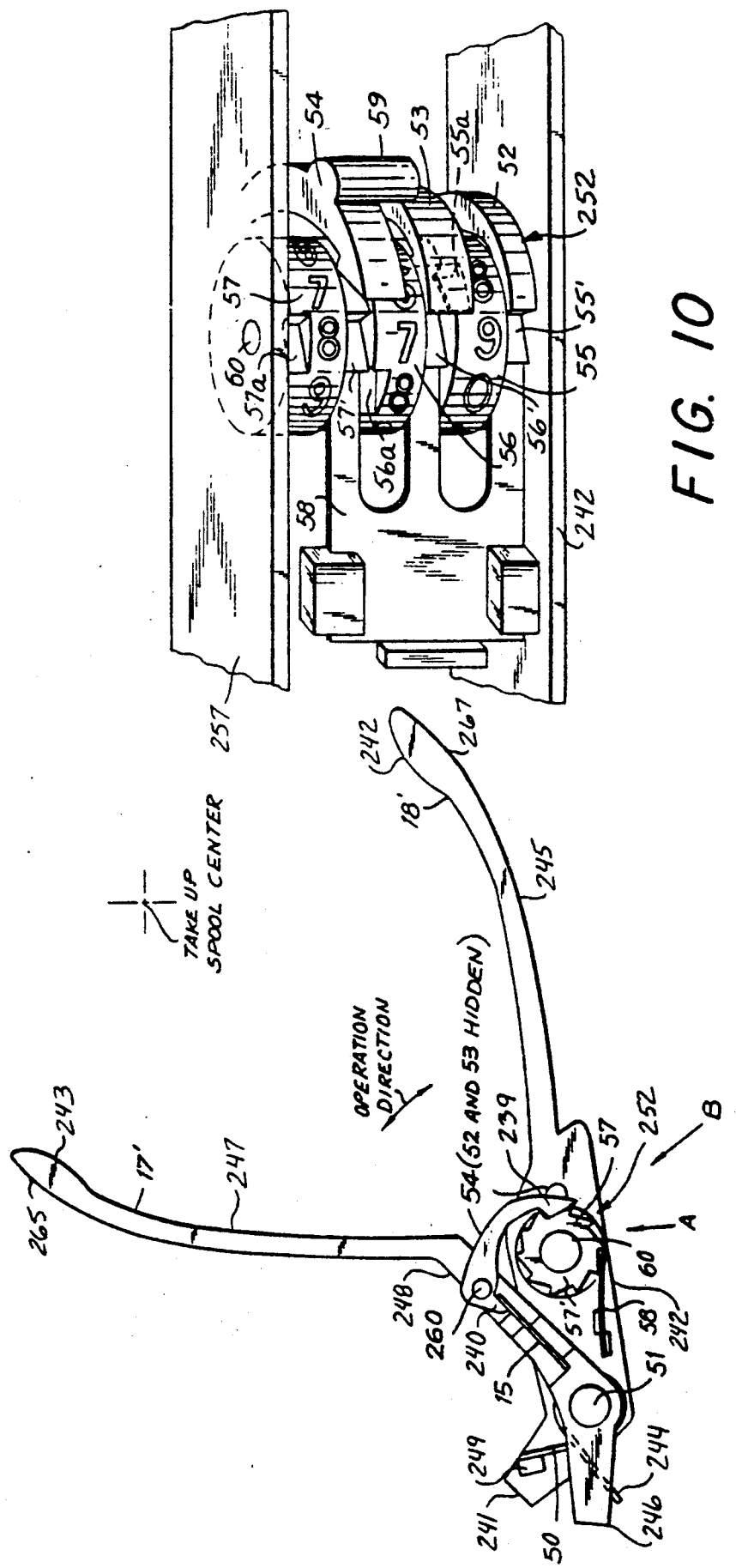

DIRECTION OF INSERTION OF DEACTIVATING PIN

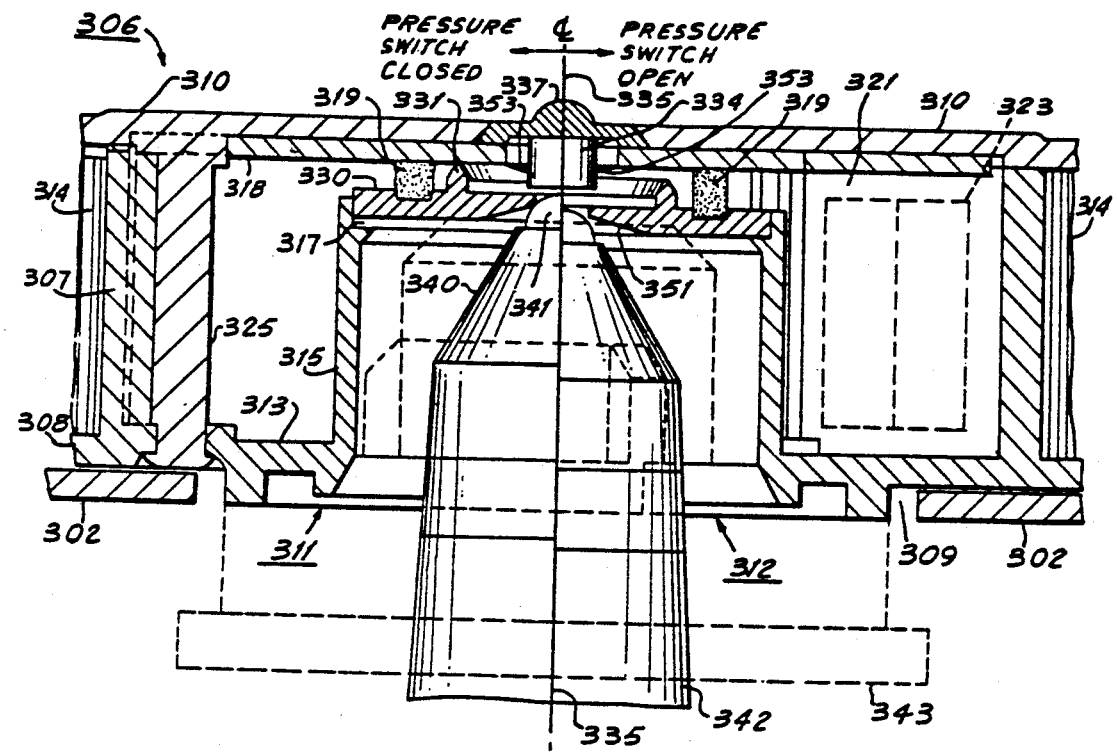
FIG. 20
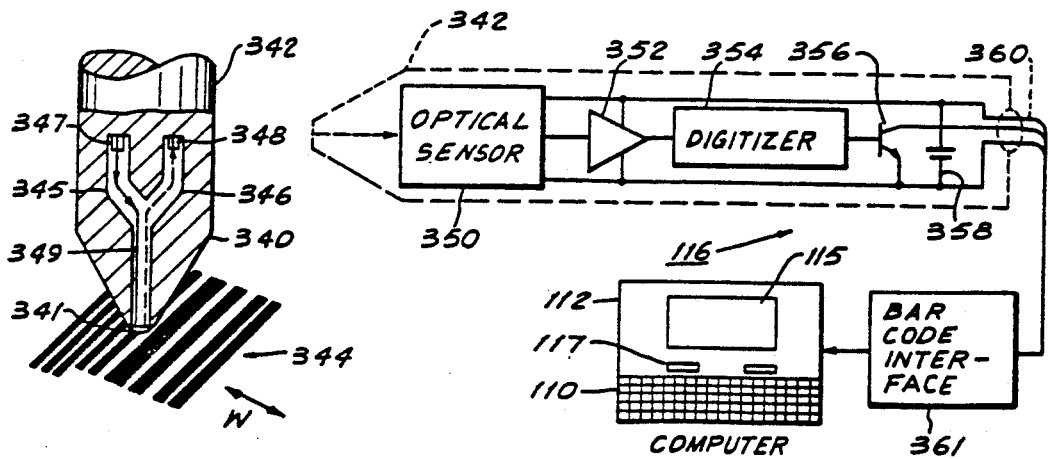
FIG. 22
FIG. 23

VIDEO CASSETTE WITH OPTICAL OUTPUT OF INFORMATION

TECHNICAL FIELD

This application is a continuation-in-part of pending U.S. patent applications Ser. No. 86/009340, filed Apr. 21, 1986; Ser. No. 117,813, filed Nov. 5, 1987 now abandoned, and Ser. No. 160,022 now abandoned, filed Feb. 24, 1988.

This invention relates to video record rental systems and methods, and to devices for ascertaining and indicating the number of times a recording has been played or used.

Rental of recorded matter is developing rapidly; the estimated retail turnover of video cassette rental already compares favorably with the gross proceeds from book publishing and record manufacturing. Commercial record rental is not widespread but this state of affairs may well alter in the light of increasing production of the so-called "compact discs". Like video cassettes, these are relatively expensive and rental may increasingly become an attractive alternative to outright purchase.

If an analogy can be drawn between a "blockbuster" film costing many millions of dollars to make and an author's manuscript, then a rented video cassette can be equated with such an article as a hardback edition of a book in a lending library or in a book exchange establishment. The studios and major distributors initially completely failed to see that, in allowing the sale or rental of these copies of the original film—purely as a sideline, they thought—they were shifting the very foundation of their enterprise. Unfortunately, this sideline is becoming the mainline, and the more quickly the screen production business recognizes the fact and restructures itself on a new foundation, the less damage it will suffer.

The studios and major distributors, then, clearly fell into the trap of perceiving video as a sideline or ancillary market. That mistake allowed them to acquiesce in the establishment of a system of video distribution that effectively cuts them off from control of the use of their own copyright material, denies them any direct participation in the exploitation of that copyright, permits blatant piracy of that copyright and seriously inhibits full exploitation of that copyright on behalf of the copyright owner.

It is a well-recognized fundamental rule of economic viability that it must be the end user who pays, but in the video cassette business the great problem is how is the end user to be made to pay?. At present the "video revolution" is in what may aptly be termed its lending library phase, and an essential problem at the moment is that it is not ascertainable whether, or how often, a video tape has been played. It was basically this fact that aborted initial attempts to charge "per rental". There was no way of monitoring cassettes to ascertain whether a video tape had been run through once or a hundred times.

Screen production/distribution businesses normally sell tapes to video rental outlets for the highest price they are able to get. This is not in the interest of the sellers because the price must be kept low—uneconomically so—in order to discourage the all-too-prevalent pirate organizations and to keep down to a reasonable level the amount of capital required to stock a video rental business. On the other hand, this price is still relatively high from the point of view of the video shop owner and so discourages him from distributing as many copies of any particular tape as he would like to. Thus, in the long term, nobody benefits.

BACKGROUND ART

It is clearly desirable, then, that video cassettes should be provided with some kind of play-counting device. One proposal was the so-called "R-Cassette" developed in the U.S.A. in 1981. This enables a video cassette intended for rental to lock automatically after one viewing. The cassette can only be rewound by using a special device, supplied only to dealers, which is linked up to a central computer that records each "use", thus enabling an exact calculation to be made of the number of times the video has been hired. This system would also enable payments to be made to copyright owners, calculated on a per rental basis. Among the factors that make this system unacceptable are:

1. It frustrates those renters who wish to view all or part of a program more than once.
2. It loads onto the dealer the time wasting task of rewinding every tape after rental.
3. It does not uniquely identify cassettes and so permits the continued depredations of pirates.
4. It requires dealers to invest in equipment that is otherwise irrelevant to the operation of his business.

The other system is known as the "Screen Key Card" system and operates by recording the material to be rented on cassette in a scrambled form. Customers are issued with a card containing a de-scrambling code which must be used in order to gain access to the video tape. This card also contains coded details of the subscriber's name, address, etc, thus enabling identification, invoicing and payment for each rental use. Each time the customer rents, the relevant de-scrambling code is programmed into the card and each time the de-scrambler is activated an electronic mark is made on the de-scrambled material. This system, however, requires the acquisition of special and complex hardware by every renter and appears to offer no auditing capability to the distributor.

Other proposals for counting and displaying the number of plays of a cassette have been proposed, but none has proven successful.

U.S. Pat. No. 3,995,319 discloses an audio tape cassette having a mechanical counter actuated by a geared arm in one corner of the cassette, the counter arm having a stop which stops the arm at an integral count so that the arm stands clear of the tape wound on the spool. This system has problems rendering it impractical. In particular the angle of the sensing arm in relation to the tape is likely to cause jamming, and uneven tension on the tape results from the fact that the arm, at times, stands clear of the tape and, at times, rubs against the tape. The space in the corner of a cassette is too restricted for location of an inexpensive and reliable counter mechanism. Furthermore, the movement of the tape reels inside the cassette when it is shaken would make such a device subject to false indexing.

U.S. Pat. No. 4,466,584 discloses video cassette having an escapement driven counter, actuated by a rocking member having two feeler arms in the free space between the spools, one riding on the tape wound on each spool. While this arrangement avoids the problem of the restricted space in the corner of a video cassette which prevents the use of the device disclosed in U.S.

Pat. No. 3,995,319 on video tape cassettes, the escapement drive is complicated, and reliance on the wedging action between the tooth of the rocking member as it is radially driven into the toothed wheel to provide the wedging force to move the toothed wheel is unreliable. Furthermore, because the radius of the tape spools does not change linearly as the tape is played, at times, enough free space may be left between the arms and the spools to permit shaking of the cassette alone to falsely register a count (or to subtract a count). Also, the problem of uneven tension on the tape is still present since the arms are not continuously urged against the tape. Still further, the counting mechanism disclosed in U.S. Pat. No. 4,466,584 interferes with the spool brake, typically present in video tapes, because all space is taken up by the rocking member and escapement mechanism.

OBJECTS OF THE INVENTION

It is an object of the invention to provide a computerized video record rental system and method in which the foregoing disadvantage of prior proposed systems and methods are eliminated or greatly alleviated, and to provide an integral counting device in the record container which overcomes the similarity debilitating defects of prior counting devices.

More particularly, it is an object of the invention to provide a rental system and method in which video records, preferably in the form of video cassettes, can be consigned by the owners of retail outlets who then rent the cassettes to the public, with the confidence that the number of times each cassette is played will be recorded accurately, and that the owner will receive a share of the rental revenues with reasonable certainty and promptness, and with a minimum of extra labor and equipment costs. It is another object of the invention to allow the owner of artistic properties (e.g., motion pictures) recorded on the records to share in the revenues generated by the rentals in proportion to the popularity of the properties.

It also is an object of the invention to facilitate the distribution of such records in a manner such as to maximize the rental revenues for both the retailers and the owners by placing a sufficiently large inventory of the records in the retail outlets at the time when the property is the most popular, without requiring an inordinately large capital outlay by either the retailer or the owner.

It is a further object of the invention to provide such a system and method in which the rental revenues are collected and paid to the owners relatively promptly and with a minimum of human labor, and with a relatively modest outlay of equipment for use in the procedure.

A further object of the invention is to provide a device for accurately and reliably counting and recording the number of times the record has been played by the rental customer. It also is an object to provide such a device which does not require any modifications of the record player owned by the rental customer; a device which will operate with any known player and does not interfere with the operation of the player or require any extra effort on the part of the rental customer to use. It is a further object to provide such a device which overcomes or greatly alleviates the shortcomings of prior devices of the same type, and is of relatively simple and economical construction.

In particular, it is an object to provide such a device in video tape cassettes which is highly resistant to or immune to counting falsely in response to normally adverse conditions occurring during transportation and handling of the video cassette, both within and outside of the user's tape player.

SUMMARY OF THE INVENTION

The foregoing objects are met, in accordance with the present invention, by the provision of a computerized video record rental system and method in which a video record unit such as a tape cassette is provided with an integral counting device for counting the number of times the record is played. Upon rental of the record, the count is recorded in computer memory, together with an identification of the record unit. Upon returns of the unit to the rental outlet, the new count is entered in the computer memory, together with the record unit identification, and the computer computes the rental fee due based on the net play count for the record unit; that is, on the difference between the count upon rental and the count upon return.

Preferably, the computer performing the foregoing tasks is a small computer such as a "personal computer" located at the rental site. The equipment located at that site preferably includes a printer which prints customer receipts bearing the identification and count information at the times of rental and return of the record unit. Input of the identification code and count information preferably is by way of scanners or "wands" which read the information electrically. However, input by use of a keyboard also is possible.

It is also preferable that a central computer is provided at a location remote from the rental sites. The rental information is transmitted from the rental sites to the central computer periodically by way of modems and telephone lines, or by way of other data communication means. The central computer is similarly linked to computers located at the record owners' place of business.

It also is preferred that an electronic funds transfer network be provided to electronically transfer funds from accounts maintained by the retailers to the owners by way of the central computer. The amounts transferred from the retailers are equal to the rental receipts less the portion representing the retailers' shares. The amounts transferred by the central computer to the owners are equal to those received from the retailers less any share retained by the operator of the rental system.

The central computer provides reports to both the retailers and the owners. The reports to the retailers include accounts of the retailer's rentals, fees due, etc. The reports to the owners include total rentals of each specific artistic property, funds transferred, inventories, returns, etc.

The counting device of the present invention preferably is a mechanically activated device which senses the growth or reduction in size of a roll of video tape in a cassette. It senses the position of the outer surface of the roll at two opposite sides of the roll, and drives a counter in proportion to the changes in the distance between the two positions.

Preferably, those positions are sensed by followers which contact the roll and follow its movements. The followers advantageously take the form of caliper arms with a rotary counter mounted on one arm and drivably coupled to the other arm, with both arms being pivotably secured to the cassette housing at a single pivot point. Thus, the arms are free to swing about the pivot point to follow the movements of the loose tape roll as it moves laterally in the cassette during handling of the cassette outside of the record player. In addition, the caliper arms contact the tape roll at opposed points along the greatest dimension of the roll. These features virtually immunize the counter mechanism from making false counts due to the lateral shifting of the roll in the cassette.

Counting may be achieved mechanically, electromechanically, electronically etc., and in this latter regard the invention may consist in a video device including a capacitive sensor and a logic chip adapted to count crenellations on a tape reel periphery to thereby sense movement in a particular frequency band covering a range of speeds consistent with the play mode; a second sensor for energizing of the circuit; a timer chip pre-set to program duration of play and triggered by the logic chip, the timer chip being adapted to time substantially total play frequency duration to produce a threshold signal via the logic chip; total number of tape plays being recorded and/or displayed for a set rental period and progressive total number of tape plays being stored for subsequent information retrieval.

Preferably, the cassette identification information is marked on the cassette housing in machine-readable coded form, such as a bar code which can be read by a conventional bar-code reading wand at the retail site. It is preferred that the count also be machine-readable.

Another advantageous counting device of the present invention combines a mechanical counting mechanism with an integral electronic storage and read-out device The mechanical count is converted to digital form and stored in a battery-energized memory element in the cassette housing. The stored count is converted to an electronically-detectable form and displayed or presented at the outside of the housing so as to be easily machine-readable. For example, the count can be displayed by means of a light-emitting diode array which can be read by a photo-detection type scanner or "wand" at the rental site, and then sent to the computer memory.

Even more advantageously, the invention provides an all-electronic counting and read-out device. The read-out device, like the one described immediately above, provides an electrically alterable bar-coding device. The counting and read-out means are built into the structure of one of the tape reels in a cassette, thus providing a unique tape reel which itself indicates the relative tape position, count of the program plays, and other information relating to the cassette and program on the tape, etc.

The information to be read out is encoded and used to create coded optical signals which are read out by an appropriate device. Preferably, the optical signals are flashes of light produced by a lamp energized by a timed sequence of electrical pulses A bar-code reader senses the flashes. The sequence of pulses simulates the pattern of signals the reader would read if it were scanning a printed bar-code.

A battery is housed in the reel to supply power. The lamp is energized only when a pressure switch is pushed, preferably by a bar-code-reading wand, so as to minimize power drain and maximize battery life.

The counting means comprises one or more flat lamps and photocell detectors built into one flange of the tape reel and operated intermittently to detect the growth or shrinkage of the tape roll on the reel by an amount indicating that a full play of the program on the tape has occurred.

The invention meets the objectives set forth above and provides a system and method well suited to make it practical for movie and other artistic property owners to rent their properties and derive maximum revenue from them, while reducing capital outlays for the rental stores and materially increasing the availability of the artistic properties to the public.

The foregoing and other objects and advantages of the invention will be set forth in or apparent from the following description and drawings.

BRIEF DESCRIPTION OF THE DRAWINGS

In order that the reader may gain a better understanding of the present invention, certain preferred embodiments thereof will be hereinafter described by way of example only, and with reference to the accompanying drawings in which:

FIGS. 2 and 8 are rear end elevation and top plan views, respectively, of one of a preferred video cassette constructed in accordance with the invention adapted for use in the system depicted in FIG. 1, having a built-in mechanical counting device for recording the number of plays of the cassette and showing the numerals of the counting device through a viewing window; with FIG. 8 showing the cassette with the top wall of the casing removed;

FIG. 9 is an enlarged plan view of a mechanical counting device very nearly the same as that of the video cassette depicted in FIGS. 2 and 8;

FIG. 10 is an enlarged perspective view of the numeral wheel and actuating arm portion of the mechanical counting device depicted in FIGS. 8 and 9;

FIG. 20 is a cross-sectional view, like FIG. 17, of a portion of the preferred form of the device of FIGS. 17-21;

FIGS. 22 and 23 are schematic diagrams illustrating the basic features of a typical bar-code reading wand utilized with the invention.

DETAILED DESCRIPTION

Figure 1:
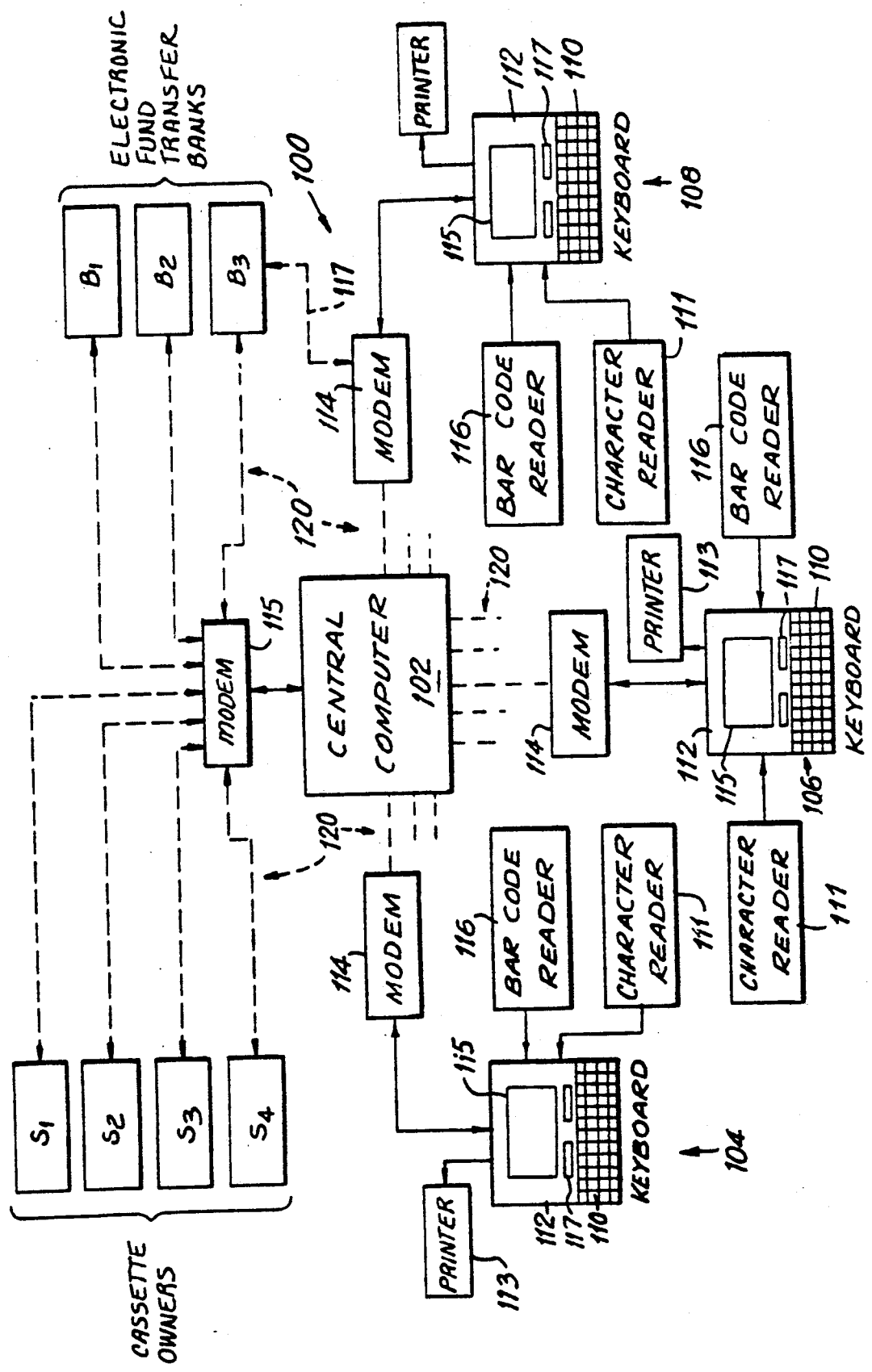
FIG. 1 is a schematic block diagram of a preferred embodiment of the computerized video record rental and accounting system of the present invention.

FIG. 1 of the drawings shows a computer system 100 for video cassette rental and accounting control. The system includes a central computer 102 and a plurality of remote "point-of-sale" terminals 104, 106 and 108, which are merely three examples of the much larger number of terminals typically comprising the system.

Each terminal 104, 106, 108, etc., includes a keyboard 110 and a microcomputer 112 such as any of a number of commercially available personal computers ("PC's"). Each terminal also includes a printer 113, a bar code reading device 116, and a modem 114. The terminal is located at a retail rental store, for example, and is coupled to the central computer 102 through the modems 114 and telephone lines 120.

Each of the computers 112 in the retail store terminals 104, 106, etc., preferably has a CRT display screen 115 and hard disk and soft disk drives for program and other storage tasks, as well as RAM and other electronic memory, as is customary with most conventional PC's.

Stored in each computer 112 is an operating program and an application program. The application program consists of a conventional module such as the "Master Video" module sold by Bonifide Management Systems, Inc. of Reseda, Cal., which is used in many video cassette sales and rental stores for various accounting functions specific to such businesses, together with modifications necessary to perform the new tasks to be set forth below. Since those modifications are well within the skill of the art to make, the specific steps used in the modifications will not be described in detail herein.

Figure 2:
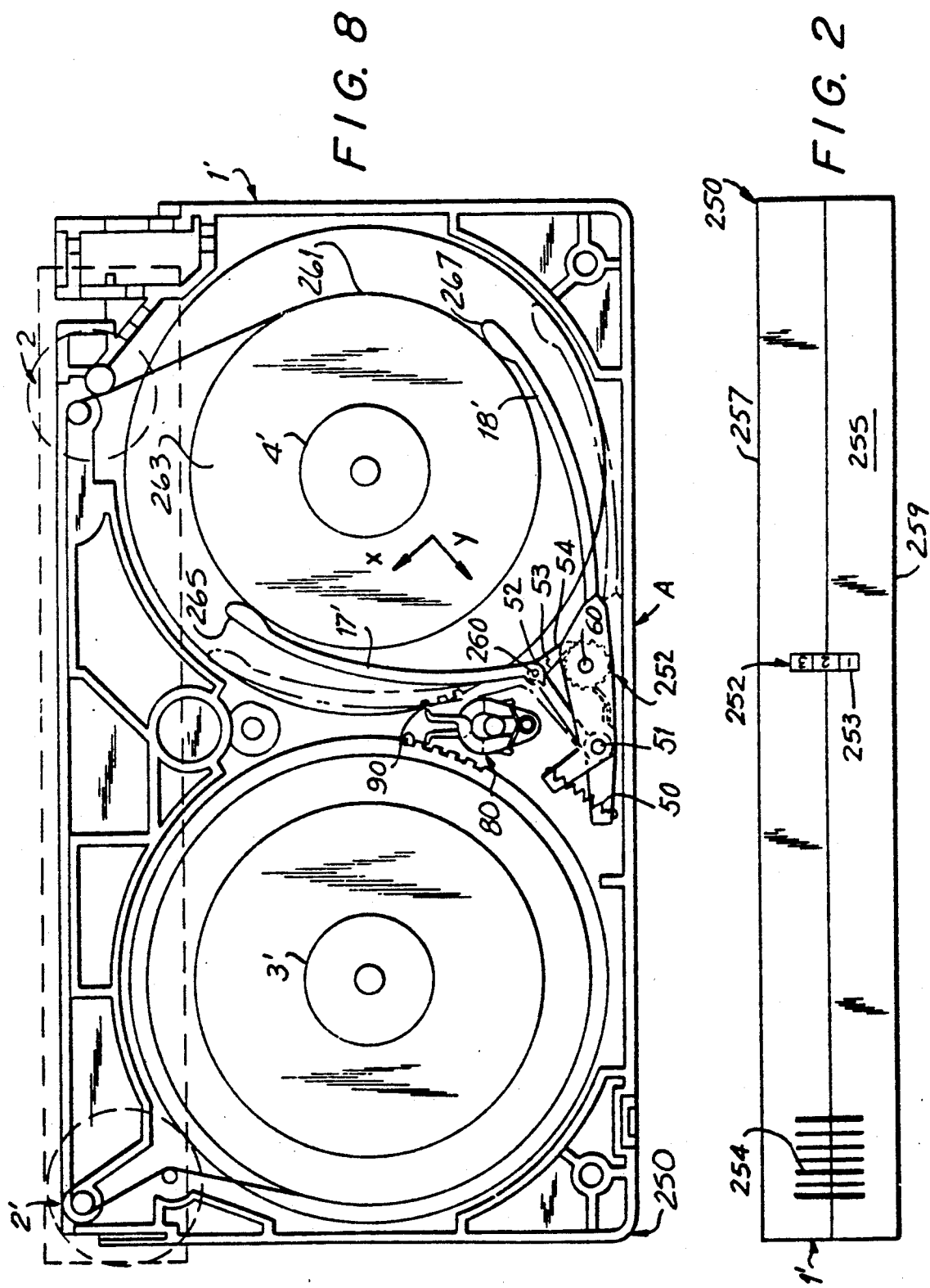

As it is shown in FIG. 2, each tape cassette 250 includes a play counter 252 which provides a count of the total number of plays of the cassette, which is preferably visible through a window 253 at the back edge 255 of the cassette.

Also on the back edge of the cassette is a bar code 254 which uniquely identifies the cassette, i.e. the copyright owner, title, copy number etc. Typically, a 12-digit code is used.

In accordance with the method of the invention, the rental of video cassettes is accomplished as follows. Preferably, the video cassettes are owned by a business entity which records the cassettes or is a cassette distributor. That entity merely consigns or loans the cassettes to the retailers. For example, the business entity is a motion picture studio or distributor which owns the artistic property recorded on the cassettes.

When a cassette is rented at a retail rental store, the rental clerk reads the bar code 254 on the cassette into the central computer 102 through the modem 114 by means of the bar code reader 116. Preferably, however, the bar code is read into the rental computer 112 in the retail store. The reader 116 is of conventional construction and is one of the types typically used in point-of-sale terminal systems. If no bar code reader is available, or if the bar code reader malfunctions, the identifying information can be entered by means of the keyboard 110. For this purpose, the information represented by the bar code also is printed on the cassette in alphanumeric characters readable by humans.

Figure 16:
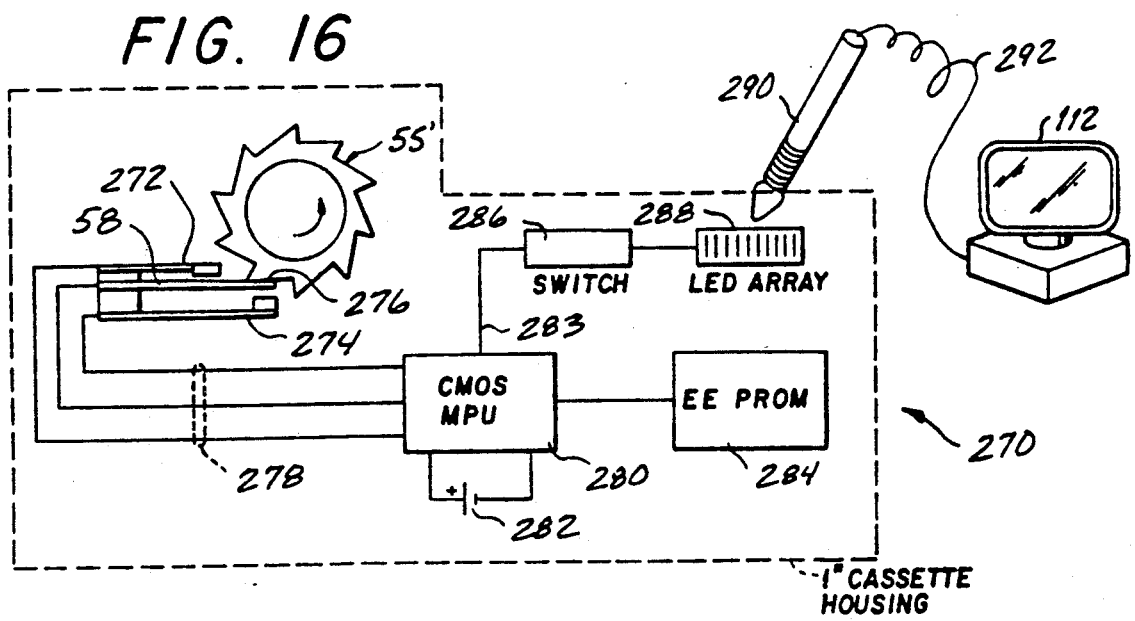
FIG. 16 is a schematic circuit diagram of another embodiment of the play-counting cassette and system of the invention.

The clerk also inputs to the computer 102 or 112 the play count from the counter 252 by means of the keyboard 110. Alternatively, the count may be read by a character reader 111, or by the bar code reader itself, if the system shown in FIG. 16 is used.

Preferably, each customer is given an identification number. If the customer is a member of a "rental club", he or she already has such a number. If not, a number is assigned, principally in order to establish a credit and trustworthiness history for customers, in order to minimize cassette and rental revenue losses.

A printed record of the transaction, including its date, the initial payment received from the customer, the rental rate per play, late charge rate, and the cassette identification and play count, is prepared on the printer 113 of the terminal and given to the rental customer. This data is stored in the memory of the rental computer 112.

When the cassette is returned, the clerk again reads the cassette identification code 254 into the computer 102 or 112, and inputs the new play count, together with the amount of any rental or late fees or other fees received from the customer at that time.

In the embodiment in which the central computer stores the data, the computer 102 uses the bar code to uniquely identify each cassette, and stores the beginning and ending play counts, computes the net play count, the rental fee and the difference between the two counts, and computes the share of the fee to be received by the owner of the cassette. At the end of each pre-set business time period, e.g. each week, the computer 102 prepares an invoice and sends it to the retailer through the telephone lines and modems, to be printed out on the printer of each terminal.

Thus, the system 100 provides for the accounting and reporting of every rental and invoicing for rental fees without separate telephone calls, messengers or mailings, thus making the rental system cost-effective.

The system 100 further provides for the collation of returns relating to each title from multiple outlets and for the transmission of those returns to the copyright owner.

In the preferred embodiment of the system 100, in which the rental computer 112 at each terminal 104, 106, 108, etc., stores the data for the individual rental transactions, the computer 112 is programmed, using the above-mentioned "Master Video" software module, with modifications, so as to operate as described above on rental of a cassette, and as described below on return of the cassette.

When the customer returns the cassette, the rental clerk inputs to the computer 112 the cassette identification data, either by way of the bar code reader 116, or by use of the keyboard 110, and retrieves from memory the information previously stored for the rental transaction. Preferably, this information is displayed on the video display screen 155 of the computer. The rental clerk also inputs the new count on the cassette counter, either by use of the keyboard 110, or by use of the character reader 111.

The computer 112 stores for the cassette the rental rate per play, the charge rate for late returns by the customer, and any other applicable charge rates. The computer subtracts the beginning cassette count from the return count, thus computing the net play count, and multiplies this times the applicable rate to determine the total rental fee.

Normally, the customer pays a certain minimum rental fee upon initially renting the tape. For example, the customer pays at least for a one day rental and one play of the tape. Thus, if the tape has been played more than once upon return, the computer notes this and subtract the initial payment made by the customer from the total fee due and computes a balance to be received from the customer at that time. When the customer pays the additional money, this is entered in the computer by the clerk, and the computer updates the total received in the transaction and indicates its completion.

If desired, the modem 114 can be of the type which is continuously enabled, and it immediately transmits to the central computer the results of the transaction. However, in most stores it is preferable that the modem 114 be of the "dial-up" type which is connected to the telephone line only when a number or sequence of numbers is dialed on a telephone dial.

In any event, periodically, such as at the end of each day, or week, the rental retailer transmits the total rental information stored in the computer 112 during the period in question.

The central computer 102 is programmed to receive and store the data from each rental computer 115. Then it periodically sorts the rental information received from many retail rental outlets and prepares various reports. Basically, the reports will summarize the number of rentals and the number of plays of each artistic property rented by each retail outlet, together with rental receipts for each property, as well as returns of cassettes to the owners, etc.

The central computer 102 also will sort the data and prepare total rentals and plays and receipts for the period from all rental outlets included within the system. Then the central computer 102 periodically transmits the reports through a modem 115 to terminals S1, S2, S3, S4, etc., located on the business premises of the cassette owners. Preferably, each terminal at the cassette owners' premises also includes a computer for storing the information received and printing out the reports transmitted.

Payments preferably are made to the owners of the cassettes and the operator of the system 100 as follows; each rental outlet maintains funds in an account at one of several banks B1, B2, B3, which has electronic funds transfer capabilities.

Whenever the central computer 102 receives from one of the rental computers 112 a periodic report of revenues, the computer 102 prepares and sends to the retailer an audit report confirming the information transmitted, together with any other financial information desired, and requesting confirmation of the correctness of the audit report. The audit report will include a percentage of the rental receipts which must be paid to the owners of the cassettes and the operators of the system 100. For example, if the retail outlet reported $1000 in rental revenues for a given period, and the retailer's share of those revenues is 20%, the central computer would indicate that the remainder, $800 was to be transmitted by the retailer.

Of course, the programming of the central computer 102 enables the system operator to poll any rental computers in which rental reports are delinquent, or for other purposes.

When the audit report is approved by the retailer, a signal is sent to one of the electronic fund transfer banks, B1, B2, B3, etc., in which the retailer has deposited adequate funds, or has an adequate line of credit, and the funds are electronically transferred from the bank through the modem 115 to the central computer 102. The central computer then computes the share to be retained for the operator of the system 100, deducts that, and electronically transmits through the modem 115 to the cassette owners their share of the rental receipts.

If desired, a data link 117 can be provided directly between the retailer's terminal and his electronic fund transfer bank so that he can communicate his approval or disapproval of the request for funds from the central computer, or so that he can enable payment pursuant to the retailer's line of credit with the bank.

The electronic fund transfer aspect of the system and method of the present invention is highly advantageous in that it avoids the delay caused by writing checks, it avoids the labor of such tasks, and avoids other labor and handling costs. Of course, payment can be made by mail or other conventional means, if preferred.

The rental system and method have further advantages in that, since the retailer need not make the significant investment required in purchasing large numbers of cassettes, he can stock larger numbers of the more popular cassettes and minimize the number of times he runs out of stock in the cassettes, thereby increasing the number of rentals of the program recorded on the cassette. This brings greater revenues to the producers of the most popular programs than from prior arrangements, in which they merely sold the cassettes to retailers who then kept all of the rental income.

The system 100 also makes it economically viable for the retailer to stock a wide variety of special interest programs that would not normally be kept in stock and return to the owners of those programs revenue that would otherwise not have been earned at all.

The rental system and method brings these benefits to the program owner without inordinately increasing the cassette production costs because the incremental costs of producing the necessary extra cassettes are relatively low.

In total, the system and method of the invention benefit all parties; the producer of the cassette, the retailer and the public, which enjoys the greater availability of its favorite programs.

REFINEMENTS

Some video store software modules such as the "Master Video" module used in the preferred embodiment of the present invention, make the printing of receipts to customers optional. For the purposes of the present invention, the software is modified so as to flag each cassette rental transaction, and mandate the preparation of a printed receipt each time a customer transaction includes such a rental. It is considered to be a substantial advantage to inevitably offer the customer a receipt at the time of a rental transaction so that he or she will have a printed record of the rental rates, etc., and will not become disgruntled upon being billed for per play charges and late charges when the cassette is returned.

Preferably, a "prompt" is added to the software which causes an inquiry to be displayed on the computer screen 115 seeking the count number from the rental cassette. The software also is modified to enable the operator to override the computer requirement for a count number. This is to allow for the correction of errors, such as where the starting count was misread by the rental clerk, or where the customer contends that the count must be inaccurate and the retailer decides to accept the customers contention. If the prompt is overridden, the clerk cannot proceed with the transaction until the count number is entered.

Whenever the override function is enabled, an exception report is generated and ultimately must be reconciled.

For each artistic property (program), the basic Master Video software is modified to add the following fields;
Revenue per play;
Revenue per day (rental charges for each day, regardless of the number of plays);
Late charges per day;
Share of per day charges owed to system operator;
Gross owed to system operator for late charges;
Total income for all plays;
Total income for all daily rentals;
Total income from late charges;
System operator charges from per play charges;
System operator income from daily rate charges;
System operator income from late charges;
The last reading on the counter for that cassette;
Location code and indication of format used at that location (VHS or BETA);
Quantity of that title on reserve at the retail location.

The "Master Video" module provides a customer report for each customer showing at least the last ten rentals by the customer where abnormal activity occurred; e.g., late returns, unpaid counts, etc. This report should enable the store to restrict rentals or to take the appropriate steps to insure better customer collections.

Whenever a rental cassette is returned with more than the basic one day/one play charge due (which has already been paid for by the customer), the operator automatically will be presented with a customer screen on the display 115 which indicates to the customer and the clerk that additional charges must be paid by the customer. If the cassette has been returned by way of a night deposit box, or by means other than in person, a notice of the extra charge is stored in the customer's file, which will be retrieved from memory and presented, either when the customer next visits the store, or when the computer files are reviewed for the purpose of preparing bills to be mailed to the customers.

The software modification enables the rental clerk to override the requirement for the additional charges, such as where the retail establishment decides to forego such charges due to the fact that the customer is a good customer, or has a justifiable complaint, etc. Of course, an exception report is prepared in response to the override.

The usual video store software module includes instructions for printing receipts for any returns involving late charges. The software is modified to include per play charges on such a receipt.

Rental rates for long term periods also can be used in the system. For example, weekly rates can be stored and retrieved.

Upon request, the rental computer 112 prepares an in-house audit report in order to enable the retail outlet operator to compute the amount that he must pay to the system operator. The report figures should match those transmitted from the central computer 102 to the computer 112 and which was described above.

It should be noted that both the cassette owner and the system operator share in the extra revenue generated by the customer either retaining the cassette for more than one day, or for extra plays above the one play initially charged for upon rental of the cassette. Thus, the cassette owners share in these additional charges as well as in the basic rental fees.

It is preferred that there be two different identification codes for each cassette; one being the unique 12 digit number described above, and the other being a different code assigned to that particular cassette by the store owner to facilitate storing and retrieving the cassette.

In accordance with another advantageous aspect of the present invention, although cassettes usually are sent to each particular retail outlet directly from the cassette owner, it also is possible for a rental outlet to receive cassettes from another rental outlet. Transfer from one outlet to another can be accomplished in order to transfer overstock from one rental site to correct an under-stocking problem at another site.

Whenever the owner sends cassettes to any rental outlet, his computer sends to the central computer 102 information indicating the number of each title sent, the cassette identification numbers and similar data. The owners computer will print a packing slip to be shipped with the shipment to the retail outlet.

The system software at the retailer's rental computer enables him to enter data regarding stock received and to print out a report that can be matched against the packing slip.

When cassettes are transferred from one store to another, a similar packing slip is prepared by the sending store, and information is transmitted to the central computer 102 just as if the goods were being shipped from the owner to the receiving store. Thereafter, the receiving store can prepare a received stock report and compare it against the packing slip.

Each rental outlet is required to return the cassettes it receives to the cassette owner when the rental life of the cassette is over. For this purpose, the rental computer 112 is used to prepare a return report which is transmitted to the central computer 102 and the cassette owner, and the retail rental outlet ships the cassettes back to the owner.

The cassette owner then can reuse each cassette until it is worn out. He can record a new program on the video tape in the cassette, and he can reset the mechanical counter in the cassette to zero, if he desires.

The central computer 102 is programmed to keep track of the total rentals of each title or artistic property by each store. When it detects the fact that a particular store has reported rentals which are well below expected norms, then an auditor will be sent to the store to determine whether the store is accurately recording all rentals. Since each cassette has an internal mechanical counter which cannot be disabled without opening the cassette, and because each cassette preferably is made relatively tamper-proof to make it difficult to disable or interfere with the normal operation of the counter, the counters provide reliable means for checking on the reporting accuracy of various retail outlets. As noted above, various exception reports are provided automatically by the software. Another exception report is provided whenever there is an abnormal jump in the recorded count. In most cases, such jumps will merely be the result of a misreading of the counter. This can be corrected and reconciled eventually.

The basic software, unmodified, provides for making reservations on a first in/first served basis by title. Similarly, the software provides a put-away report which flags returned cassettes to indicate that they are now available for rental. The software is modified so that all rental cassettes rented pursuant to the present invention will be flagged and each unique cassette identification number will be indicated together with the last cassette counter reading.

Defaulting customers should be flagged as delinquents. Delinquent customer files should remain in memory. Thereafter, the software routine should automatically search its records for the name of any new customer to make certain that that name is not located in the delinquent file. This prevents customers from taking out new memberships when they are already delinquent. Alternatively, a customer name list can be displayed so that the existence of a file on that customer can be determined visually by the clerk.

Preferably, any transaction such as overrides, etc., which is contrary to normal store policy should be highlighted on the screen of the computer 112.

COUNTING CASSETTES

Figure 3:
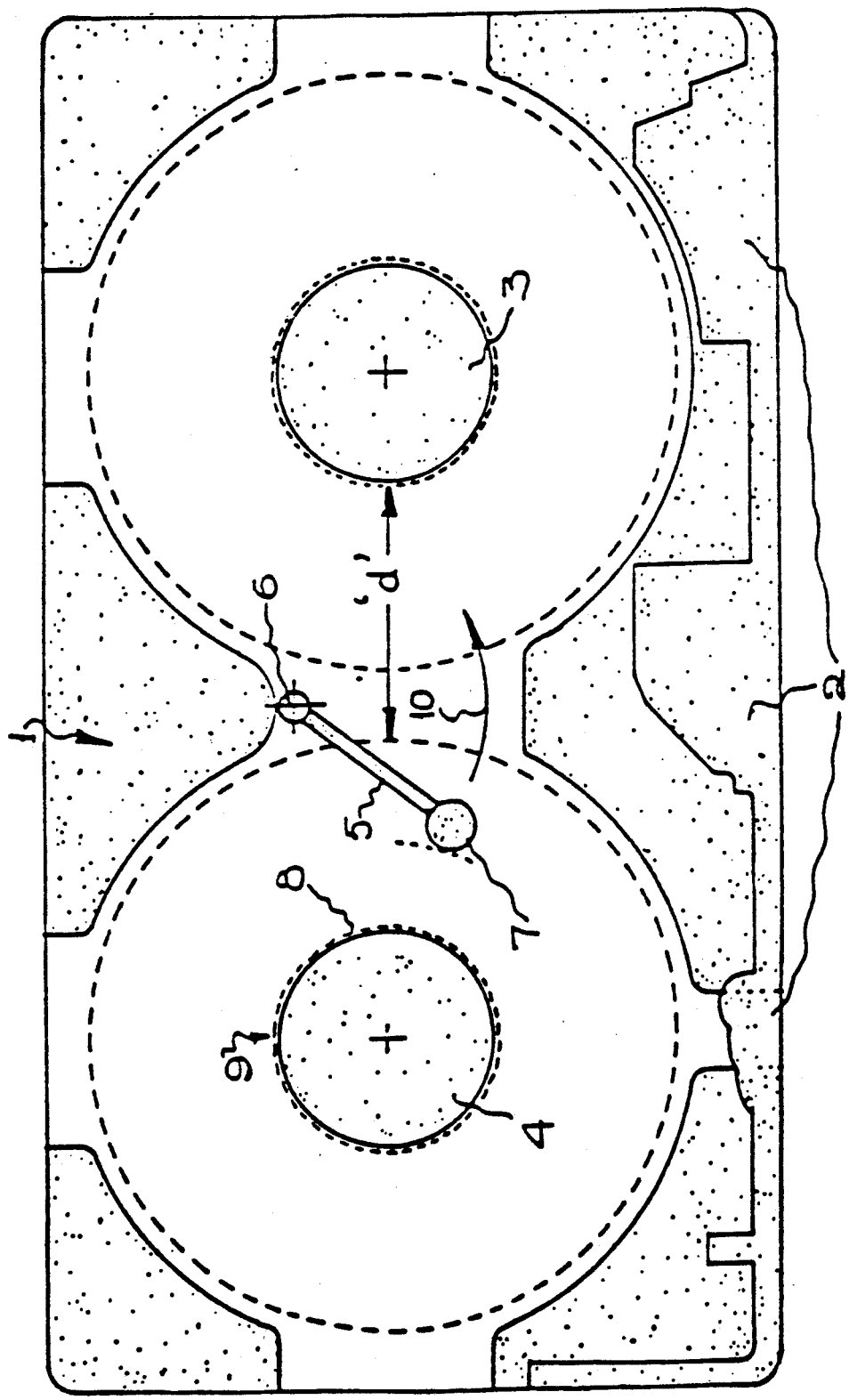
FIG. 3 is a top plan view of another video cassette constructed in accordance with the invention, shown with the top cover removed.

Referring now to FIG. 3, a video cassette incorporating a built-in mechanical counter, well adapted for use in the foregoing system, is illustrated. The video cassette includes a casing generally referenced 1. The cassette has a magnetic-tape guidance assembly 2, a delivery reel hub 3 and a take-up reel hub 4. When a tape is played, the diameter of the reel centered on take-up hub 4 increases while that on delivery hub 3 simultaneously decreases. When the tape has been fully played, it is rewound back onto delivery hub 3. It might be noted that the distance "d", that is to say, between the two reeled portions of tape at any point of play, is not constant. At "half-way play" position this distance is very slightly less than it is at "full-play" or "start-of-play" positions. Moreover, the distance "d" varies slightly between the "Beta" and "VHS" systems and therefore the inventive counting device is adapted to be able to be employed in both kinds of video cassettes by selecting the minimum average distance for "d" in respect of both systems.

The mechanical counting device of this embodiment includes an arm 5 pivoted within casing 1 at a point 6 equidistant between hubs 3 and 4. Pivoted arm 5 terminates in a camming head 7 and may be spring-urged to maintain it in constant contact with the surface of the outer turn of tape on hub 4, this contact being initially at the point 8 on broken circle 9 which represents the minimum tape diameter on hub 4. To reduce frictional wear on the tape, camming head 7 may include a wheel.

After commencement of play, the diameter of the tape portion on take-up reel hub 4 increases and moves arm 5 through an arc indicated by the curved arrow 10. When a predetermined number of degrees of arc has been traversed by pivoted arm 5, this latter activates a trip means of a counting mechanism to thereby indicate that the tape has been played, or substantially played, on time. Ideally, this count is initiated when, say, from about 50% to about 90% of the tape has run through On the rewinding of the tape back onto delivery hub 3, a ratchet-and-pawl assembly may ensure that the "rewind" is not counted as being a "play". Alternatively, the trip means may be activated to count both winds and re-winds, the pair of counts therefore representing one play of the tape. In other words the counting device will thus record the number of times that a consumer has benefited by the playing of the video tape cassette.

Figure 4:
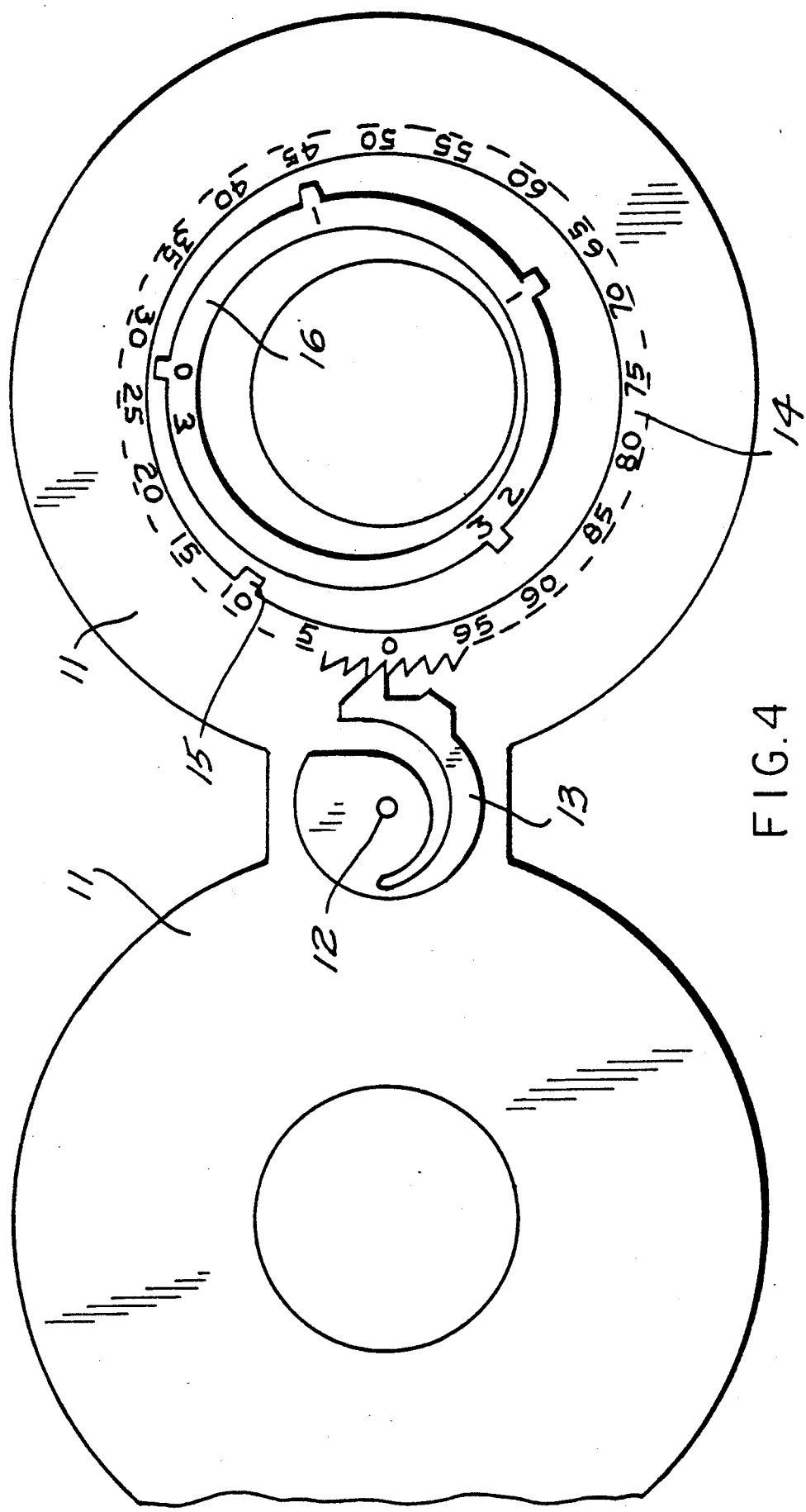
FIG. 4 is a schematic plan view of another video cassette constructed in accordance with the invention, with the cassette case removed.

FIG. 4 shows a suitable counting mechanism which includes a planar cover plate 11 adapted to be accommodated within a video cassette casing, as that generally referenced 1 in FIG. 3. In this embodiment the arm is pivoted at point 12 coaxial with a counter-actuating pawl member 13 which is arranged so as to rotate as the arm moves through its arc in response to change in reel diameter. When a predetermined number of degrees of arc has been transversed, the tip of pawl member 13 contacts a tooth of a peripherally-toothed counter ring 14 and counts one play. When a hundred plays have been counted, a lug 15 on the inner periphery of ring 14 meshes with a co-acting lug on the periphery of a hundred-plays counter ring 16 which may be adapted to count up to, say, 399 plays. On the rewinding of the tape back onto the delivery hub, this ratchet-and-pawl arrangement ensures that the "rewind" is not counted as being a play.

Figure 5:
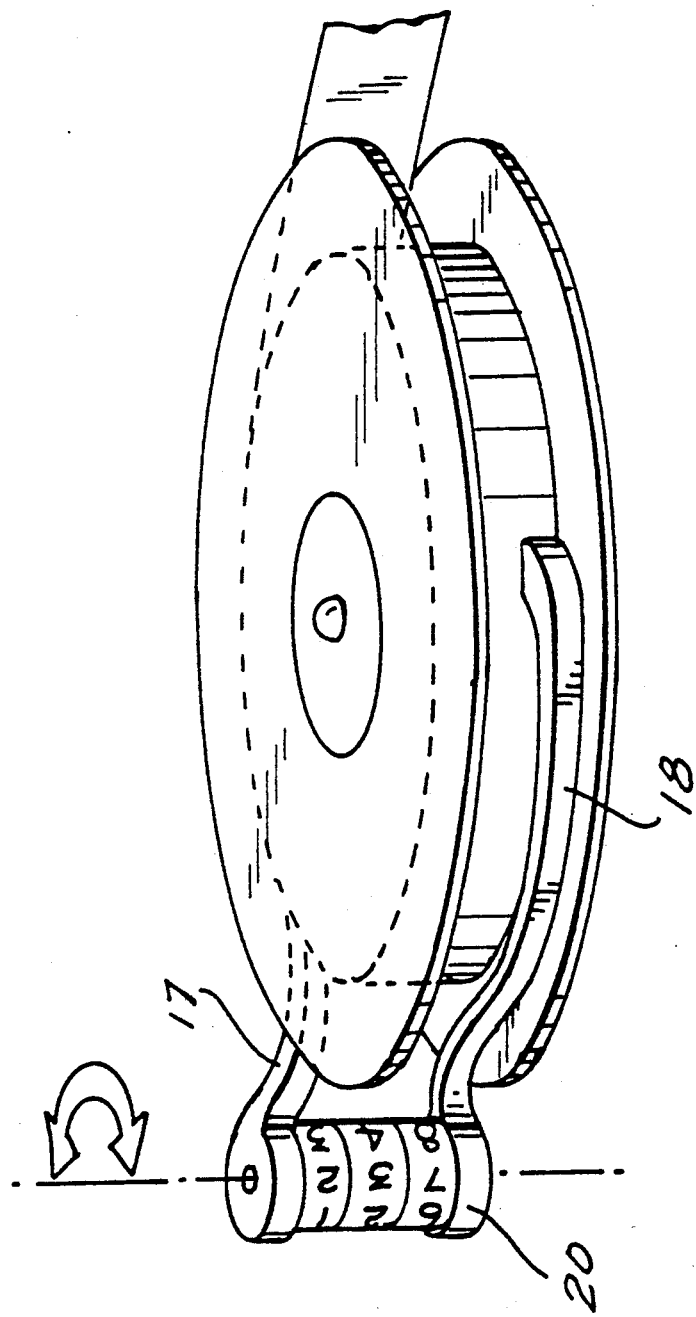
FIG. 5 is a perspective view, partially schematic, of a portion of another cassette embodying some of the basic principles of the embodiment of FIGS. 2 and 8.

In the further embodiment shown in FIG. 5, the device includes a pair of pivoted arms 17, 18 which operate to measure the diameter of the reel of tape, a drum counter 19 moves accordingly on its axis of rotation 20 to count plays.

Figure 6:
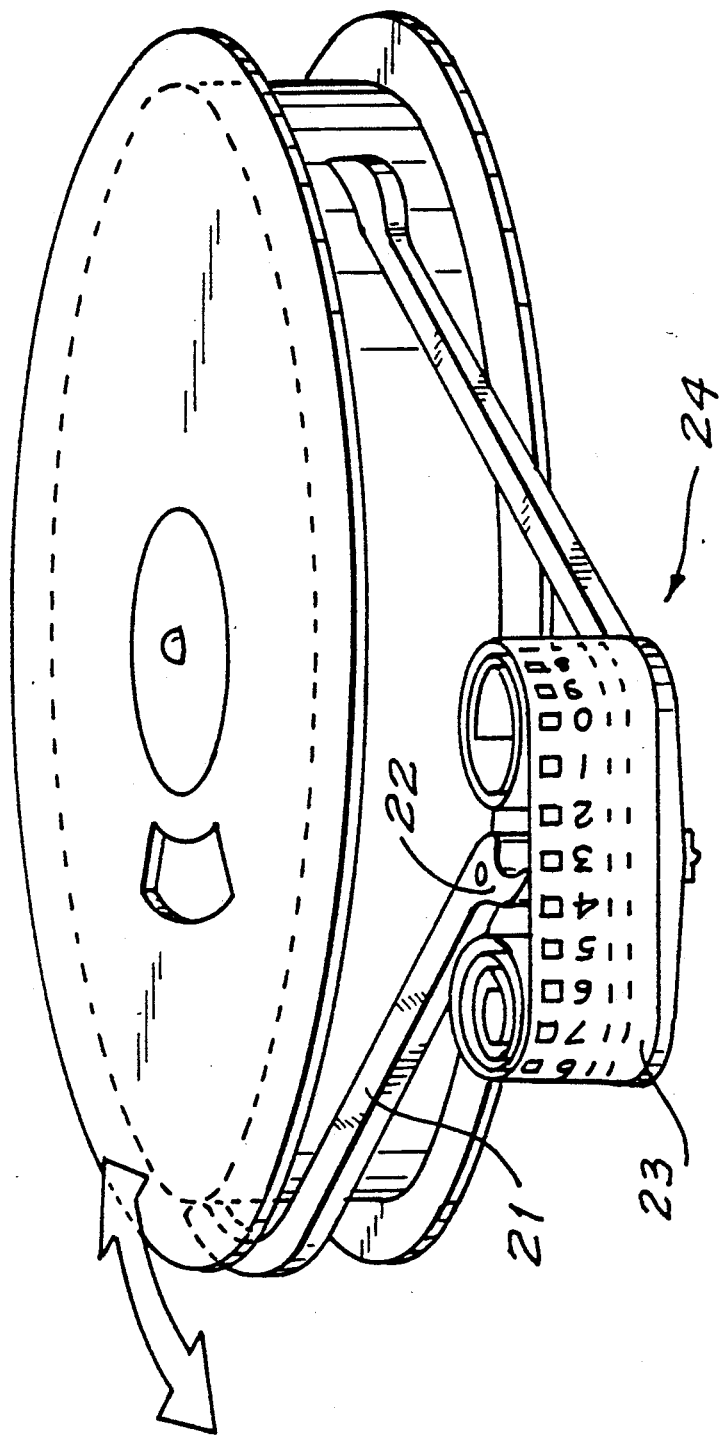
FIG. 6 is a perspective view, partially schematic, of a portion of another cassette constructed in accordance with the invention.

Yet a further mechanical embodiment is to be seen in FIG. 6; here, a pivoted arm 21 senses the change in diameter of the reel. Arm 21 is provided with a finger 22 adapted to engage with a tape 23 of a tape-counter device 24.

Figure 7:
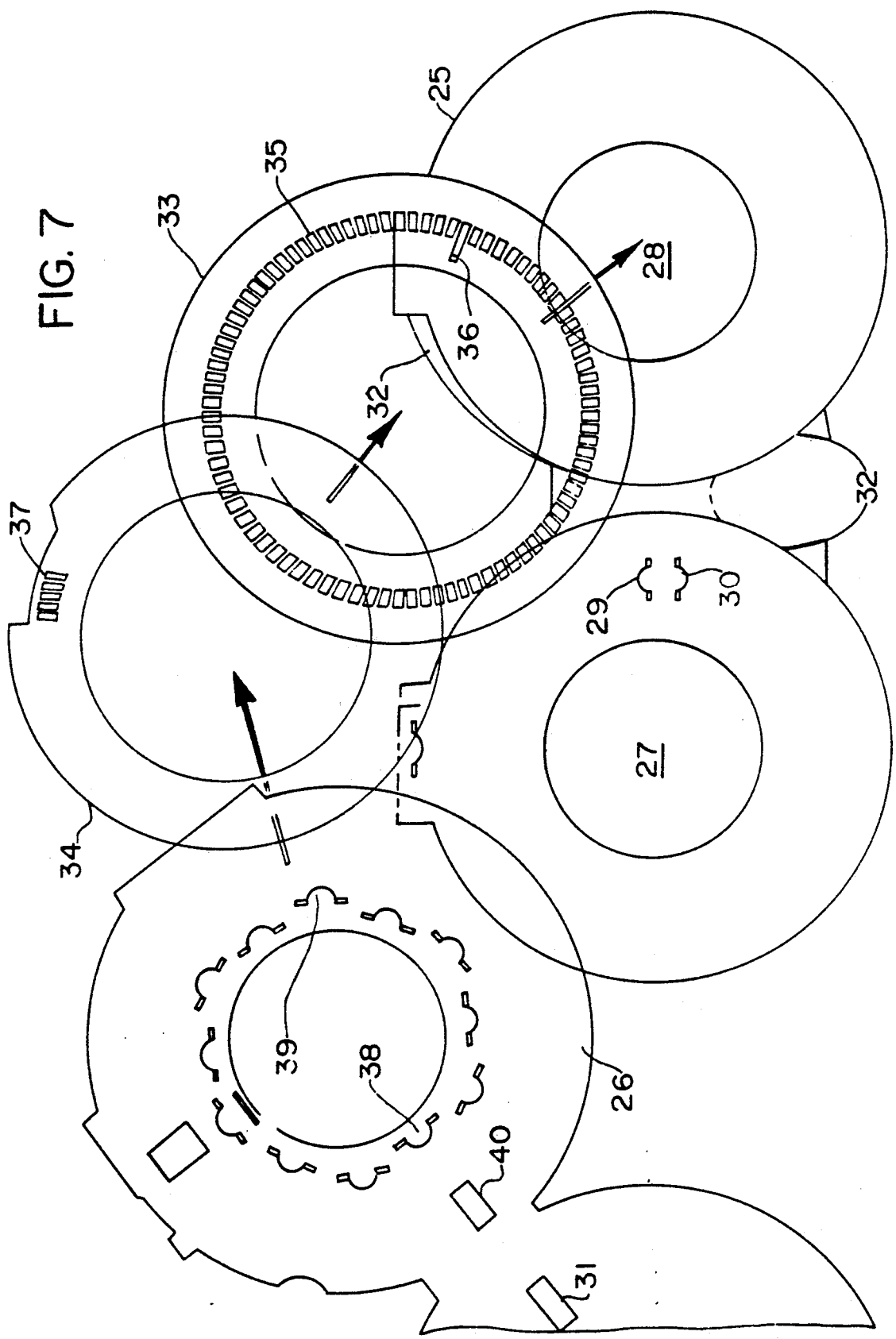
FIG. 7 is an exploded view of another embodiment of the counting means of a video cassette constructed in accordance with the invention.
Figure 11:
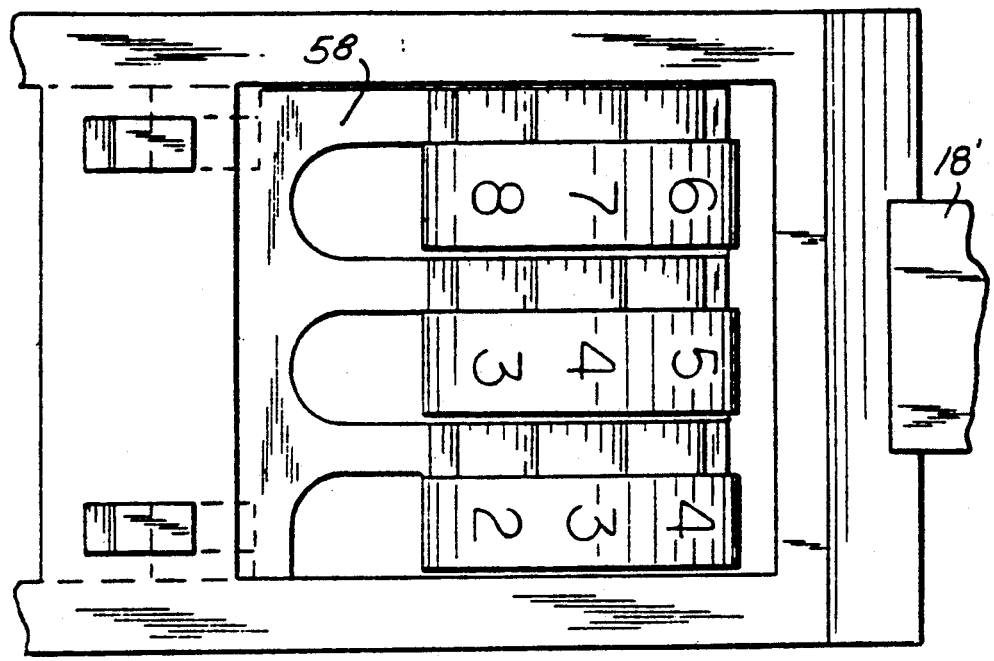
FIG. 11 is an enlarged elevation view, taken in the direction "A", of the numeral wheel portion of the mechanical counting device depicted in FIG. 8.

In another embodiment there is provided an actuator assembly of the type illustrated in exploded view in FIG. 7. The actuator assembly is adapted to be housed within the video cassette casing between the delivery/take-up reels and the bottom face of the cassette casing.

The actuator assembly/counter assembly comprises a top cover plate 25 slidably engaged to a stationary or fixed bottom cover plate 26. The top cover plate 25 comprises two eccentric or elliptical openings 27 and 28 to allow for movement of the top cover plate relative to the hubs of the delivery and take up reels. Tongue members 29 and 30 on the top cover plate are adapted to engage the elongate slot 31 in the bottom cover plate and help facilitate the top cover plate's slidable engagement with the bottom cover plate.

On the upper face (not shown) of the top cover plate 25 is arranged a frame 32 comprising two arcuate members spaced from the outer periphery of magnetic tape on the delivery and take up reels, said arcuate members being rigidly connected via a bridging member axially aligned with a notional line running through the axial centers of the two reel hubs. The arcuate members are affixed to tab extensions on the top cover plate. The arcuate members contain spring plate members adapted to contact the outer periphery of tape on either the delivery reel or the take up reel. The whole top cover plate assembly or carriage is thus adapted for movement as magnetic tape is transferred from one reel to the other.

The counter assembly comprises a units counting wheel 33 and a hundreds counting wheel 34, both with indicia indicated adjacent the outer peripheral edge. The units counting wheel comprises 100 slots 35 spaced 3.6° apart, each slot except one being 3.0mm×1 mm, with the remaining slot 36 being 8.0 mm×1 mm; this latter slot allows for engagement of the hundreds counting wheel when the units counting wheel has passed through one rotation. The hundreds counting wheel is provided with a series of five slots 37 spaced 4° apart.

A series of six spaced tabs 38 about an inner periphery of the bottom cover plate provide a bearing or hub for the units counting wheel, and a further series of six tabs 39 spaced outwardly therefrom provide a bearing or hub for the hundreds counting wheel. The indicia on the counting wheel(s), corresponding to the number of plays of the video cassette are readable through window 40, which has a corresponding window opening in the bottom face of the video cassette casing.

The slots 35 to 37 of the counting wheels are engaged by tongue means (not shown) depressed and depending from the lower surface of the top cover plate 25. The combination of these slots and the tongue means provides a ratchet-and-pawl arrangement for rotation of the counting wheels according to the number of plays. On the rewinding of the tape back onto the delivery hub, this ratchet-and-pawl arrangement ensures that the "rewind" is not counted as being a play.

All components can be manufactured from plastics material. In this embodiment, the top and bottom cover plates, and the counting wheels, can all be fabricated from 0.08 polyester.

PREFERRED EMBODIMENT

FIGS. 2, 8, 9, and 10 show a preferred video cassette having caliper arms of the general type depicted in FIG. 5 for sensing the change in diameter of the tape wound on the spool or reel.

Referring first to FIG. 2, the video cassette includes a casing with a top wall 257, bottom wall 259, and a rear wall 255. As it is shown in FIG. 8, the cassette has a magnetic tape guidance assembly 2', a delivery reel hub 3' and a take-up reel hub 4'. When a tape is played, the diameter of the tape roll 263 wound onto the take-up hub 4' increases while that on delivery hub 3' simultaneously decreases.

Now referring to FIG. 8, in this preferred form, the counting device of the invention includes a pair of caliper arms, 17' and 18', which sense the changing diameter of the tape roll 263 on the take-up reel. Caliper arms 17' and 18' are spring-loaded inwardly against the outer surface 261 of the take-up roll by means of a spring 50.

Figure 12:
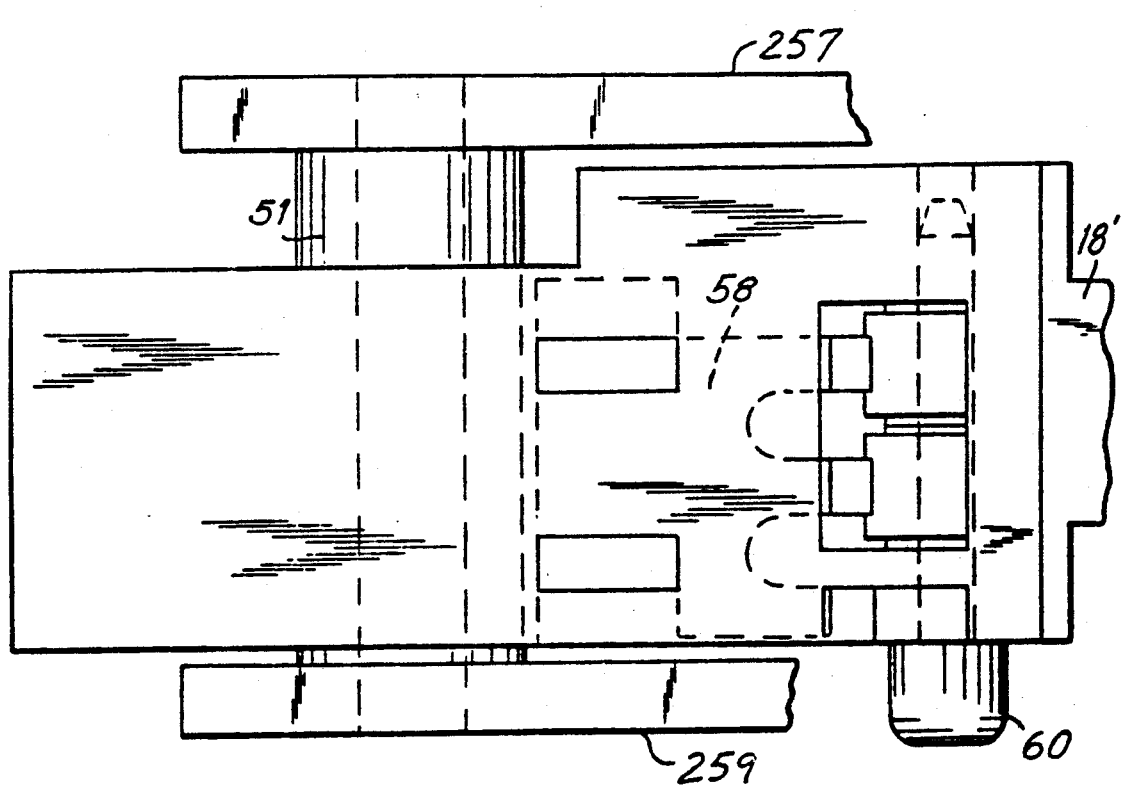
FIG. 12 is an enlarged view, taken in a direction opposite to the direction "A" of the numeral wheel portion of the mechanical counting device depicted in FIGS. 8 and 11.

The caliper arms 17' and 18' are pivotably mounted on a shaft 51 which as shown in FIG. 12, is secured to the top wall 257 and bottom wall 259 of the casing 1'. As it is shown in FIG. 8, the shaft 51 is located between the left ends of the caliper arms and the right ends 265 and 267 of those arms, which contact the outer surface 261 of the take-up tape roll 263. Thus, the spring 50 holds the caliper arms in contact with the tape roll 263 at all times, both when the tape roll is revolving as the tape is being played or rewound in a tape player, and also when the tape roll shifts laterally during movement of the cassette in transit.

As the caliper arms 17' and 18' are forced apart by the increasing diameter of the tape roll on the take-up reel, the counter 252 is driven so as to increase the count by one when the diameter of the tape roll 263 reaches a pre-determined value. This value typically is a fraction of the maximum diameter of the tape roll 263. Usually, this fraction is greater than one half, but substantially less than maximum diameter, so that one play will be counted when a major fraction of a full length tape has been played.

The tape roll diameter-sensing mechanism shown in FIG. 9 is the same in function and operation as that shown in FIG. 8, but differs in some details. The operation of both mechanisms now will be described by reference solely to FIGS. 9 and 10 through 12.

The caliper arm 17' has a right end 265 with a convexly curved bearing area 243 to ride on the surface of the tape roll with minimum friction and wear, and a section 247 which is curved so as to ensure clearance between the tape roll and the arm at all points other than the bearing area 243 when the roll 263 is at its largest size. The caliper arm 18' has a similar bearing area 243 and curved portion 245.

The arm 17' has a mid section 248 and a left end section 246. The arm 18' has a relatively wide mid section 242 and a left end section 241.

The spring 50 is a torsion spring wrapped around the shaft 51 and is anchored at one end to a block 249 attached to the left end 241 of the arm 18', and at the other end 244 to the left end 246 of the arm 17'.

As it is shown in FIG. 10, the counter 252 consists of three counting wheels 55, 56 and 57 with integral ratchet wheels 55', 56', and 57' rotatably mounted on a shaft 60 which is secured at its lower end to the mid section 242 of the caliper arm 18'. FIG. 9 shows the counter 252 with the top wheel 57 removed so that the toothed ratchet wheel 57' is exposed to view.

As it is shown in FIG. 9, a shaft 260 is secured at one end to the mid section 248 of the caliper arm 17'. Rotatably mounted on the shaft 260 are three actuating arms 52, 53 and 54. Only arm 54 is visible in FIG. 9, but all three arms are visible in FIG. 10.

Each of the arms 52-54 has a left end projection 240 (FIG. 9) and a toothed right end 239. A leaf spring 15 is secured at its left end to the mid-section 248 of the caliper arm 17'. The right end of the spring 15 bears against the projections 240 and urges each of the arms to rotate clockwise about the shaft 260 and thus urges the toothed end 239 of each actuation arm against its corresponding ratchet wheel.

Referring to both FIGS. 9 and 10, a three-pronged leaf spring 58 is secured at its left end to the mid section 242 of the caliper arm 18'. Each of the three prongs of the spring 58 bears against one of the three ratchet wheels 55', 56' or 57' and acts as a stop to prevent rotation of the ratchet wheel backwards, thus ensuring that the count of the counter will only increase.

The three number-bearing wheels 55-57 and their respective ratchet wheels 55'-57' are identical to one another. Each ratchet 55'-57' has ten teeth. Wheel 55 counts digits; wheel 56 counts once every ten digits; and wheel 57 counts once every hundred digits. Thus, the counter 252 can count up to 999 before being reset to zero.

As it is shown in FIG. 10, each wheel 55-57 has a notch 55a or 56a or 57a which forms a ratchet tooth in its upper edge.

When the tape is played, the diameter of the tape roll 263 increases and the caliper arms are spread apart. As this happens, the arm 52 tangentially pulls against a tooth on ratchet wheel 55' to rotate the wheel 55 by the distance of one tooth to record a count of one. Arm 53 similarly is urged toward the ratchet teeth on the "10's" numeral wheel 56, but rides on the upper edge of wheel 55 and is thus prevented from entering the ratchet teeth of the ratchet wheel 56 to pull the wheel 56 forward one notch until the toothed end of arm 53 falls into the one ratchet tooth 55a on the upper edge of wheel 55. This occurs every ten digits. The same mechanics then apply to arms 53 and 54 and wheels 56 and 57, except that actuating arm 54 includes a lug 59, which rides on the back of actuating arm 53. This means that actuating arm 54 will not engage a tooth on wheel 57 until actuating arm 53 simultaneously engages a tooth on wheel 56. Therefore the wheel 57 remains stationary through the "90's" of any one hundred digits until it reaches "99", when all actuating arms mate with teeth so that all three counter wheels 55, 56 and 57 advance one notch simultaneously.

When the tape is rewound and caliper arms 17' and 18' are free to move inwardly, the actuating arms 52, 53 and 54 reset into the next ratchet tooth, as allowed by the single ratchet 55a-57a on adjacent counter wheels. The spring projections 58 prevent reverse rotation of the counter wheels.

The process will then be repeated as additional plays are counted.

The counter is adjacent the back edge 255 (See FIG. 2) of the cassette, and its count can be read through the window 253. The window 253 preferably includes a magnifying lens.

As it has been noted above, the preferred counting mechanism discussed above is highly advantageous in that the mechanism prevents false counting due to shifting of the tape reels in the casing or housing 1'. The reason for this is that the counter mechanism detects only differential movement by the caliper arms. This is due to the fact that the counter mechanism 252 is mounted on one of the caliper arms and the actuating arms 52-54 are mounted on the other. Thus, only rotation of the caliper arms away from one another drives the counter. Therefore, if the take-up spool moves in the direction X shown in FIG. 8, the caliper arms 17' and 18' both rotate about shaft 51 by approximately the same amount, since each arm is urged against and follows the outer surface of the roll 263 of tape on the take-up reel Since this causes no differential movement of the arms, the counter mechanism is not driven.

Since both of the caliper arms bear against the tape roll at about its greatest dimension, any movement of the roll in the "Y" direction creates negligible differential movement of the caliper arms and no false counting.

Another advantage of the use of the caliper arms is that because the diameter of the tape roll 263 is detected instead of the radius, the motion created by a given amount of tape motion is twice the relative motion created when only one roll size detector is used. This increase in motion constitutes an improvement over such systems as disclosed in either U.S. Pat. Nos. 4,466,584 or 3,995,319, since the devices disclosed in these patents are capable only of detecting the radius of the tape wound on the spool. Thus, the present invention provides for simpler, more direct and more accurate counting.

SPOOL BRAKE

Figures 13, 14:
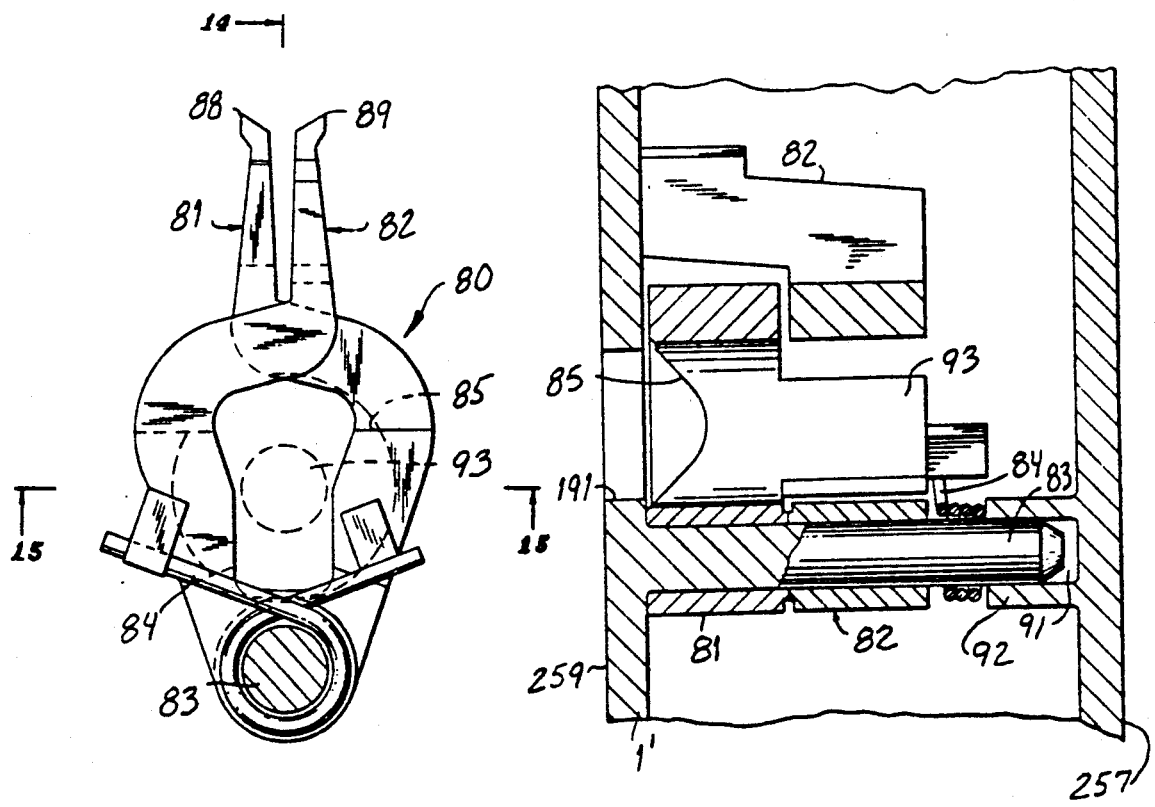
FIG. 13 is an enlarged top plan view of the tape spool brake depicted in FIG. 8.
FIG. 14 is a cross sectional view, taken along the line 14—14 of FIG. 13, of the tape spool brake depicted in FIGS. 8 and 13, with a portion of the cassette casing.
Figure 15:
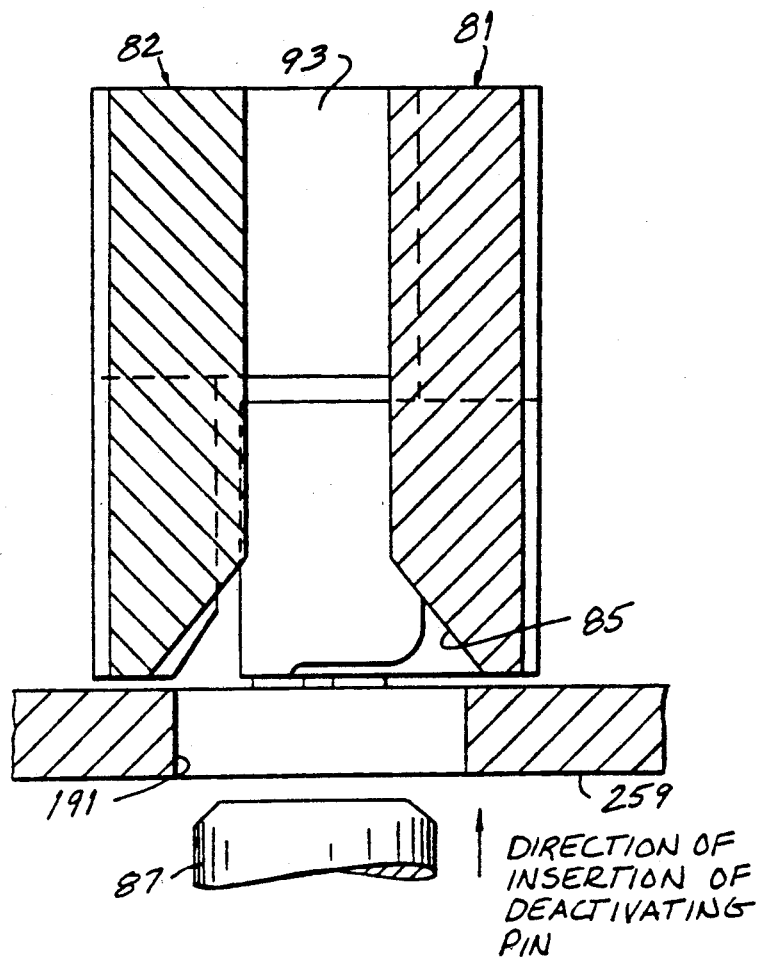
FIG. 15 is a cross sectional view, taken along the line 15—15 of FIG. 13, of the tape spool brake depicted in FIGS. 8 and 13, with a portion of the cassette casing.

The video cassette of the present invention preferably includes a new spool brake assembly of inventive design to fit the restricted space in the cassette. With reference now to FIGS. 8, 13, 14 and 15, the spool brake 80 includes arms 81 and 82, which pivot on a post 83 which, as it is shown in FIG. 14, is formed integrally with the bottom wall 259 of the cassette housing.

The upper end of the post 83 fits into a hole 91 in a boss 92 extending downwardly from the top wall 257 of the housing 1'. (Neither the top wall 257 nor the bottom wall 259 is shown in FIG. 13).

As it is shown in FIGS. 13 and 14, arms 81 and 82 pass over each other in scissor-like fashion. The ends of the arms form teeth 88 and 89 shaped to engage the sprocket teeth or castellations 90 (FIG. 8) in the edges of the base disks of each of the tape spools. Arms 81 and 82 are urged by a torsion spring 84 away from one another and into engagement with the teeth 90 so as to engage the brake 80 and prevent the tape spools from rotating while the cassette is outside of a tape player.

As it is shown in FIGS. 13 and 14, a hole 191 is provided in the bottom wall 259 of the cassette housing Aligned with the hole 191 is a hole 93 between the arms 81 and 82. The lower edge of the hole is beveled at 85 to facilitate insertion of a pin into the hole 93.

When the cassette is loaded into a VCR machine, a brake deactivating pin 87 in the VCR is inserted into the hole 191. The diameter of the hole 93 is substantially less than the outer diameter of the pin 87. Therefore, the pin 87 wedges the brake arms apart. This holds the teeth 88 and 89 away from the spools and keeps the brake disengaged while the cassette is in the VCR. The brake 80 permits rotation of the spools only when the cassette is inside a VCR.

While the foregoing description has been couched in terms of mechanical counting, counting may nevertheless be achieved electro-mechanically, electrically electronically, or, indeed, by any feasibly means. For example, the inventive device may utilize the crenellations that are provided on a tape reel to facilitate braking operation; a capacitive sensor and an IC Logic chip sense movement in a particular frequency band which covers the range of speed consistent with play mode. Rewind frequency produces the signal to provide a null or unity input. Upon threading tension, a second sensor energizes the circuit. A timer chip pre-set to program duration is triggered by the logic chip and times out the total play frequency duration, producing a threshold signal to display via the logic chip adding the appropriate count to the display when the cassette is rewound or removed from the cassette player. The total tape plays are recorded and/or displayed for the hire period and the progressive total for the cassette is stored for retrieval by the owner.

Memory output may be visual or electronic however, preferred is direct reading by computers. When a cassette is returned and "plugged in" to the shop's computer which outputs data like title, number of plays, etc. The computer calculates hire charge from data on royalty, cost recovery or the like. Hirer's account is debited and royalty transferred. Total tape wear is accurately known since total footage past the heads is known.

ELECTRONIC COUNTING/READOUT

FIG. 16 is a schematic diagram of an electronic counting and readout system 270 which detects the tape roll size changes, converts those changes into play counts, stores those counts electronically and displays them electronically in a machine-readable format. The count can be read into one of the rental computers 112 by means of a bar code reading "wand" 290. If desired, the mechanical counter also can be used to give a count readable by humans.

The means used to detect the tape roll size changes is that described above and shown in FIGS. 8-12. This mechanism drives the mechanical counter 252 (FIG. 2) to give a count which can be read by humans. In addition, mounted in the cassette housing 1' are a pair of switch contacts 272 and 274, a CMOS microprocessor chip 280, an EEPROM chip 284, a battery 282, a switch 286 and a light-emitting-diode ("LED") array 288.

The spring arm 58 which is used to prevent reverse rotation of the "units" ratchet wheel 55' (also see FIG. 10) is used as a flexible contact member which acts with the contacts 272 and 274 to produce an electrical count-indicating signal and deliver that signal over lines 278 to the microprocessor 280. When the arm 58 is fully engaged in one of the notches in the ratchet wheel 55, it is at its uppermost position and makes contact with contact 272.

As the ratchet wheel 55' rotates, the tooth 276 against which the arm 58 bears starts to bend the arm 58 away from contact 272. At the position shown in FIG. 16, the arm does not make contact with either contact 272 or 274.

At a pre-determined position, e.g., three-fourths of the way through its downward deflection, arm 58 reaches contact 274. The microprocessor 280 is programmed to have an "AND" function at its input so that a count signal is developed only when two signals have been received due to the opening of contact 278, and the other due to the closing of contact 274. The microprocessor is programmed to count these signals and store the count in the EEPROM. The count is sent over a line 283 to a LED array 288 which converts the count into a pattern readable by the bar code reader wand 290.

The LED array 288 also displays the cassette identification information which is permanently stored in the EEPROM 284. Thus, the array 288 displays both the identification information and play count in machine-readable form so that both sets of data can be read with a single application of the bar code reader wand 290.

The LED array 288 emits light of the same wavelength as that emitted by the wand 290. The LED array forms in a pattern which simulates the alternating light and dark bands sensed by the wand when it sees an ordinary bar code.

Because the battery 282 should be small and should last a very long time without replacement, the microprocessor 280 is programmed to disconnect the battery 282 automatically when it has not received an input signal for a certain length of time, indicating that the cassette is not being played or scanned. However, the data stored in the EEPROM 284 is not lost and remains stored even after the power is turned off. The contacts 272 and 274 remain energized at all times, but create no power drain unless the microprocessor is powered up.

When one of the switch contacts 272 and 274 is opened or closed, the microprocessor powers up and is ready to operate.

A switch 286 is provided in the cassette to power-up the microprocessor when it is desired to read out the count, etc from the cassette. The switch 286 can be a simple pressure-operated switch which is accessible at the outside of the cassette and can be operated by simply pressing it with a finger, pencil, or the tip of the wand 290, or any other handy object.

Alternatively, the switch 286 can be a photo-cell switch operated in response to receipt of light emitted by the wand 290.

It should be understood that the system 270 makes a separate character reader 111 (FIG. 1) unnecessary for reading the count into the computer 112 because a single bar code reader 116 will suffice.

The above described electronics can be run on a watch battery or rechargeable cell.

FIGS. 17 through 23 show the preferred form of the electronic counting/readout device and method of the present invention.

Figure 17:
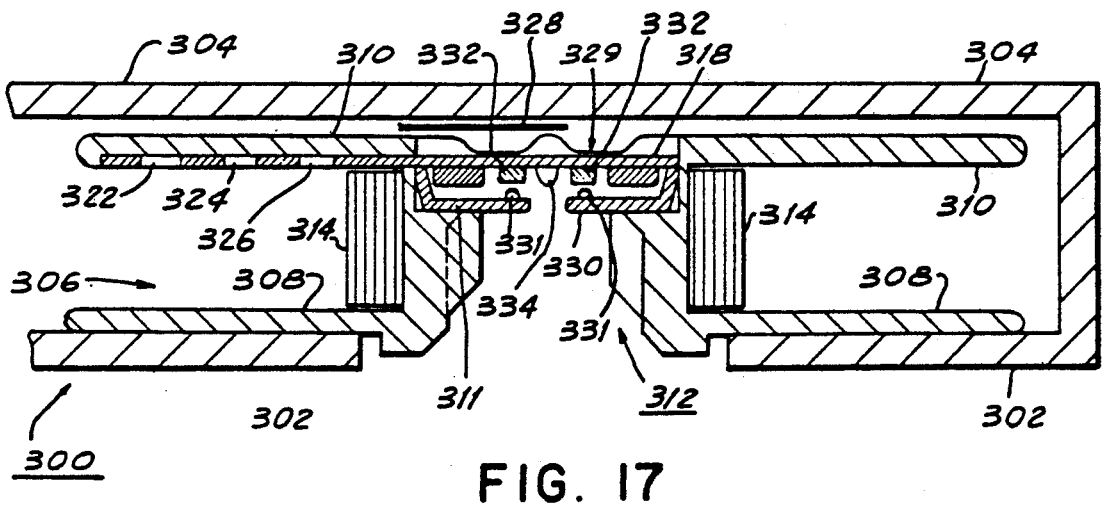
FIG. 17 is a cross-sectional, partially broken-away and partially schematic view of a tape cassette and electronic counting/readout device of the invention.

FIG. 17 is a partially schematic cross-sectional view of a portion of a video tape cassette 300, with the section being taken through a take-up or dispensing reel 306 in the cassette.

The reel 306 is a unique device which not only stores and dispenses recording tape, but also contains integral means for electronically counting the number of plays of a program on the tape, and providing a bar-coded output of that and other information.

The cassette 300 includes a housing which has a bottom wall 302 and a top wall 304. The bottom wall has a hole through which the hub 311 of the tape reel is accessible from outside of the cassette. The hub 311 has a socket or receptacle 312 with splines which engage with similar splines in a drive spindle in the tape recorder/playback unit. The drive socket, spindle, and recorder/playback unit are conventional.

The tape reel 306 has a lower flange 308 and an upper flange 310 secured together by means of the hub 311. A relatively small amount of tape is shown wound on the hub at 314.

ELECTRONIC PLAY COUNTING

Figure 18:
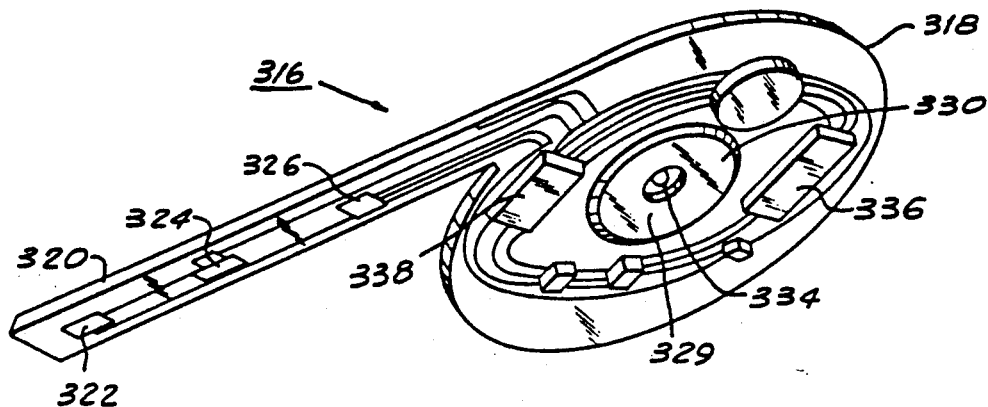
FIG. 18 is a perspective view of a portion of the device of FIG. 17.

FIG. 18 is a perspective view of a counting module 316 which is built into the tape reel 306. The unit 316 consists of a thin printed circuit card 318 with an arm 320 having a light source 322 and two light sensors 324 and 326 mounted on the arm at radially spaced-apart locations.

The operation of the counting module 316 is as follows. Light from the light source 322 shines downwardly and is reflected off of the bottom flange 308 upwardly to the sensors 324 and 326. When the roll of tape 314 grows to a size such that it covers the innermost sensor 326, light cannot reach it. This primes the detecting circuitry so that when the tape roll grows enough so that the second sensor 324 is blocked, the electronic circuitry (to be described below) indicates one count. This count is counted and stored in an electronic counter formed by the circuitry mounted on the board 318. The circuitry includes an EEPROM chip 338, and a microprocessor chip 336, as well as other circuitry to be described below.

Although the lamp and the sensors could be located in opposite flanges, with the lamp 322, for example, being located in the upper flange, and the two sensors 324 and 326 located in the lower flange 308, the present arrangement is advantageous in that it locates all of the sensors on a portion of the same circuit board as that used for the LED 334 and other circuit components. Also, all of the sensors are located in the upper flange where debris from the tape will not fall onto the sensors or the lamp and thus impede their operation.

The counting module also can be operated in the reverse manner, where the emptying of the tape from the reel, rather than the accumulation of tape, causes the detection of one count.

CODED READOUT

As it is shown in FIGS. 17 and 18, located at the center of the circular portion of the card 318 is a pressure-sensitive switch 329 and an output LED 334.

Figure 19:
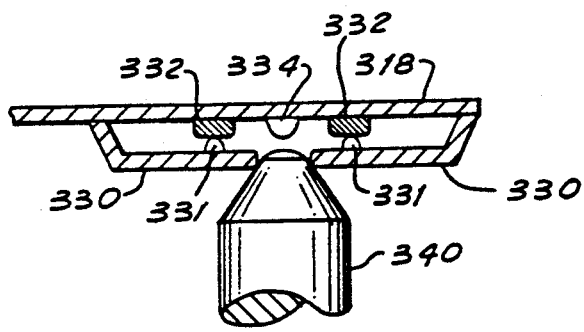
FIG. 19 shows a portion of the view of FIG. 17 during read-out.

As it is shown in FIGS. 17 and 19, the pressure switch 329 has a flexible lower plate 330 with a central hole giving visual access to the LED 334 which is aligned with the hole. A contact ring made of conductive material 331 is attached to the underside of the bottom plate 330. A second contact ring 332 is attached to the circuit board 318. The dimensions of the contact rings are such that normally they are spaced apart. However, as it is shown by FIG. 19, when the tip 340 of a bar-code reading wand is inserted into the cavity 312 and into the LED access hole, and is pressed against the edges of the bottom plate 330, the plate flexes inwardly so that the conductive rings 331 and 332 make contact with one another. This enables the electronic circuitry to supply a series of timed pulses to the LED 334. This series of timed pulses simulates the scanning of a bar-code.

The code which is thus read out indicates the total number of times the tape in the cassette has been played, as well as other information regarding the cassette and the program on the tape, as in the device shown in FIG. 16 and described above.

The bar-code reading wand is conventional. By enabling the count of the counting device to be read-out with a simple bar-code reading wand of the type that typically is used in point-of-sale terminals, the count of the number of plays of the tape can be entered into a point-of-sale computer at the video rental store without manual keyboarding. All that the operator need do is insert the wand tip into the drive socket hole briefly when it is returned. This simple procedure is all that is needed to enter into the computer the beginning and ending counts, and enable the computer to compute the per-play fee due from the customer.

Certain proposed prior art electronic play counting devices suffer from the defect that they need a plug or other electrical connector to make electrical connections to an outside device which senses the count in the cassette. This electrical connector is believed to make it possible for any user or vandal to send electrical signals into the cassette and destroy its counting components or cause it to give a false reading.

The present invention overcomes this defect by providing a light output which can be read only by a bar-code reading wand, so that electrical access to the electrical components in the housing is not permitted.

The read-out of the count is extremely simple, merely requiring the check-out clerk to press the tip of the wand into one of the sprocket holes of the cassette. This may be even simpler than wiping the wand across a printed bar-code on the outside of the cassette. Of course, the printed bar-code cannot be changed, whereas the count output by the LED 334 is changed electronically each time the cassette is played.

The arrangement of light sensors and lamp in the counting module 316 is highly advantageous in that the entire assembly, including lamp and sensors and connecting circuitry, is mounted on a thin printed circuit card which is fitted into a molded recess in the upper flange 310 of the tape reel 306.

Not only does this make the counting device very compact, but it provides a unique tape reel with the ability to give a machine-readable output indication of the count of the number of program plays, and other information regarding the tape and/or the program recorded on the tape. This is highly advantageous in that the reel will fit into a standard cassette housing so that manufacturers will not have to modify the usual video tape cassette except by substituting the counting reel for one of the conventional reels. This reduces manufacturing costs and resistance to adoption of the counting of plays in the rental of video cassettes.

FIG. 20 is a cross-sectional view of a portion of a preferred embodiment of the tape reel structure of the invention.

The bottom flange 308 and the hub 311 of the tape reel 306 are molded as a single part, and the upper flange 310 is molded separately. Both parts are made of polystyrene.

Integral with the lower flange 308 is a vertical wall 307. A boss 325 extends between the upper and lower parts of the tape reel. It is ultrasonically welded to hold the two parts of the tape reel together.

A metal bearing member 337 has a frustro-connical outer edge which fits into a hole in the upper flange 310 having a similar shape. The bearing member bears against the usual spring 328 (part of which is shown in FIG. 17) when the reel is thrust upwardly by the spindle 343 of the VTR, thus providing a low-friction bearing for rotation of the reel in the cassette. The output LED 334 is secured to the printed circuit board 318 by means of solder 353. The printed circuit board 318 is mounted in a molded recess in the upper flange structure.

The hub 311 consists of a lateral portion 313 and a vertical portion 315 with an annular flange or ledge 317 forming a receptacle and stop member for the pressure switch plate 330. The plate 330 is made of brass and has a sharp-edged ring-shaped contact member 31 projecting towards the printed circuit board 318. A high density resilient foam rubber ring 319 urges the plate 330 away from the printed circuit board 318 and against the flange 317 to hold the pressure switch open until it is depressed by pressure from a bar-code reading wand.

A bar-code reading wand 342 with a tip 340 and a lens 341 in the tip are shown in FIG. 20 in or near operating position when data is being read out of the cassette. The wand tip 40 is shown in two different positions near or contacting the pressure switch.

The portion of the drawing to the left of the centerline 335 in FIG. 20 shows the pressure switch and wand in the positions they reach when the pressure switch is closed by pressure from the wand. The portion of the drawing to the right of the centerline 335 shows the pressure switch and the wand when the wand has been moved slightly away from the plate 330, and the pressure switch. The foam ring 319 is shown compressed to the left of centerline 335, and is shown extended to the right of that line.

The central aperture in the pressure switch plate 330 has a beveled entrance edge 351 which guides the tip of the wand to the proper location to receive light from the LED 334; a location in which the centerline 335 and that of the wand are aligned. The LED 334 is symmetrical with respect to the centerline 335 so that the rotary position of the reel 306 does not affect the read-out by the wand.

As it is shown in the right-hand portion of FIG. 20, the tape reel construction forms an annular cavity 321 into which is inserted a battery 323. Another battery (not shown) like the battery 323 is located in the cavity 321 approximately 180° from the battery 323 so that the tape reel will be rotationally balanced. The battery 323 preferably is a very long-life 6 volt lithium battery of the type used in watches. Because of the special features of the invention insuring low battery power drain, it is believed that, in the normal course of events, the battery will have several years of life, the life being approximately equal to that of the tape cassette it is used in.

Shown in dashed lines in FIG. 20 is a spindle 343 inserted into the hub 311 to drive the tape reel. The spindle 343 is, of course, a part of the recording and playback unit into which the cassette 300 is inserted.

The reel shown in FIG. 20 also has the tape detector structure shown in FIG. 24 and described below.

As it has been noted above, the bar-code reading wand 342 is conventional. A particular model which has been successfully used in a embodiment of the invention is the Hewlett Packard Model HBCS-2500. The general structure of such a wand 342 is illustrated schematically in FIG. 22, which is a cross-section taken through the tip of the wand.

The printed bar-code 344 which the wand is designed to read is shown beneath the tip of the wand 342. It consists of a series of black stripes of varying width and white spaces between the stripes. When the wand is moved across the bar-code pattern 344 in the direction of the arrow W in FIG. 22, light from a lamp 347 travels through a conduit 345, 349 to the tip of the wand where it is focused by the lens 341 on to the bar-code pattern. Any light reflected from the pattern back to the wand is transmitted back up through the passage 349 and another passage 346 to a photodetector 348. The amount of light reflected by a white space is very large and that reflected by a black line is relatively low, so that the photodetector 348 produces timed pulses of varying widths and spacings in response to being scanned across the bar-code pattern 344.

FIG. 23 shows schematically the electrical components of a typical bar-code reading wand useable with the present invention. The components shown in the wand tip in FIG. 22 comprise an optical sensor 350. The output of the optical sensor is delivered to an analog amplifier 352 into a digitizer 354 which digitizes the signals it receives.

An output driver transistor 356 and capacitor 358 are provided at the output of the digitizer and the optical sensor 350. The output signals are delivered through a cable 360 and a conventional bar code interface unit 361 to a computer 112 used at the rental store (see FIG. 1).

Figures 21, 24:
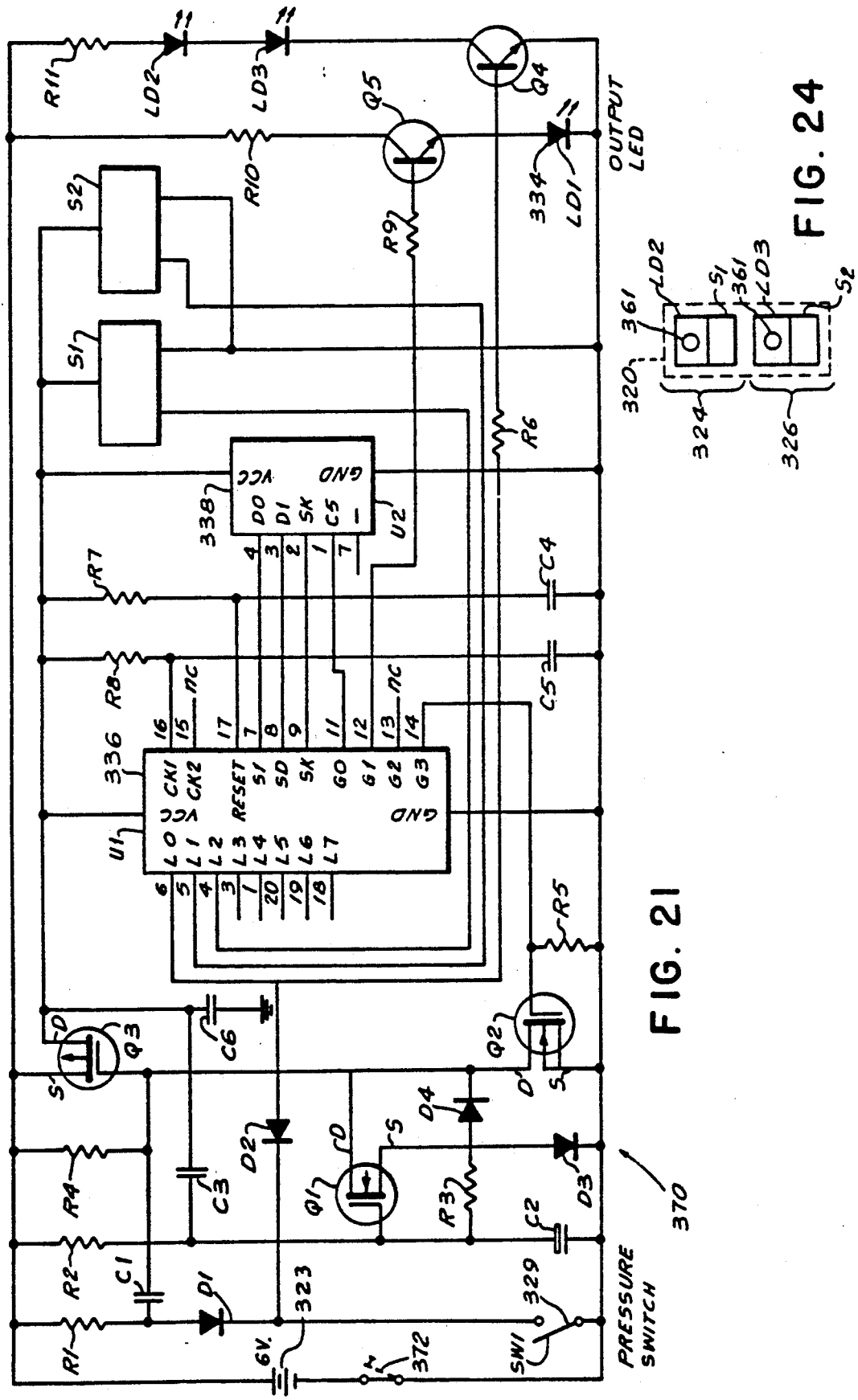
FIG. 21 is a schematic circuit diagram of the operating circuit of the preferred device of FIGS. 17-21.
FIG. 24 is a schematic plan view of tape detectors used in the device of FIGS. 17-21.

FIG. 21 shows a preferred operating circuit 370 of the present invention.

As it is shown in FIG. 24, in the preferred embodiment, instead of having a single lamp 322 and two detectors 324 and 326 as shown in FIG. 18, each detector 324 and 326 consists of a pair of side-by-side elements including a light-emitting diode and a sensor. Unit 324 consists of an LED LD2 and sensor S1, and unit 326 consists of an LED LD3 and sensor S2. Each light emitting diode has a small integral lens 361 which is used to focus the light from the diode into a narrow beam, most of which, when reflected back to the sensor S1 or S2, is concentrated on the sensor and is available for switching purposes. This enhances the efficiency of operation and minimizes power drain on the battery.

Now referring to FIG. 21, the components used in the circuit 370 are given the same reference numerals as those used when describing them above. In addition, other symbols are used for some of these elements. The pressure switch 329 thus is also labeled "SW1". Similarly, the micro-processor or micro-controller 336 also is labeled "U1" and the EEPROM or E2PROM 338 is labeled "U2". The output light emitting diode 334 also is labeled LD1.

LOW POWER DRAIN OPERATION

To prolong battery life, the micro-controller U1, memory U2, and sensors S1, S2 are normally turned-off. Power from the battery 323 is switched to these components by p-channel vertical D-MOS transistor Q3. Switching of Q3 is effected in two ways:

One way is by closure of the pressure switch 329 (SW1) when reading information out. This charges capacitor C1, causing the gate voltage of Q3 to fall below the source voltage long enough for Q3 to energize the micro-controller.

The second way is by regular intermittent operation to check on the size of the tape roll to see if a count should be registered. On a regular set interval (2 to 3 minutes) n-channel MOSFET Q1 is turned on as its gate-source voltage rises under the control of RC timer network R2-C2. When Q1 turns on, it lowers the gate voltage of Q3, allowing it to switch on and power up the micro-controller. C3 applies positive feedback to speed the switching process.

When powered on, the micro-controller (U1) executes its internal program. Its first operation is to output a positive signal on G3 (pin 14) which will turn on n-channel MOSFET Q2. This now holds the gate of Q3 low, ensuring continuity of the power delivered to the micro-controller. Q2 now also discharges the capacitor C2 in the RC timer network via R3 and diode D4.

Although the pressure switch SW1 may have initiated the power on cycle, and though it may remain closed, because it is capacitively connected via C1, it cannot maintain the power connection to the micro-controller. The maintenance of this connection is controlled by the micro-controller itself via output G3 and MOSFET Q2. When the micro-controller has completed execution of its internal program, it turns off its own power by opening the connection to G3.

The time interval of 2–3 minutes between intermittent operations is a function of the power consumption of the device, the battery capacity, and the desired battery life, as well as the speed at which a tape roll grows or shrinks in the cassette at normal playing speeds. Ideally, if the battery drain were not too great, it would be desired to set the time interval as low as possible. However, the time period cannot be so great that it causes the device to miss a play count or to miss the indication of a rewind condition to indicate that the tape has been rewound. Thus, the time interval should be somewhere between a few seconds and around 5 minutes, with 2 to 3 minutes being a reasonable compromise.

As an option, another improvement in battery life can be obtained by utilizing a switch 372 formed by or located adjacent the spring 328 (FIG. 17) which is located within each video tape cassette. The switch 372 will be closed if and only if the cassette is located in a tape player and the drive spindle is inserted into the hub of the reel. This lifts the reel in the cassette and closes the switch 372. With this arrangement, there would be no operation or power drain until the cassette is inserted into a player.

Tape Detection Circuitry

Whenever the micro-controller is turned on, the two light-emitting diodes LD2 and LD3 are energized through a current-limiting resistor R11 and an switching transistor Q4 whose base is connected through resistor R6 and diode D2 to the pressure switch 329, and to the micro-controller output lead L0.

Referring again to FIG. 18, one of the LED-sensor pairs 326 is located relatively close to the hub of the reel 306, and the other pair 324 is located radially outwardly from the pair 326. The pair 26 is located at a position such that it detects the condition in which the reel is about 10% full, and the pair 324 is located to detect when the reel is about 70% full.

Under control of the micro-controller output L0 (pin 6) transistor Q4 turns on LED's LD2 and LD3 for about 50 micro-seconds. During this 50 micro-second "flash", sensors S1 and S2 are read by micro-controller input lines L1 and L2 (pins 5 & 4). If no tape occludes the light path from either LED to its neighboring sensor, the sensor will give a positive output signal.

The sensor output signal levels have the meanings set forth in the following truth table:

| S2 | S1 | MEANING: |
|---|---|---|
| 0 | 0 | The reel is less than 10% full |
| 1 | 0 | The reel is more than 10% but less than 70% full |
| 1 | 1 | The reel is more than 70% full |

The micro-controller is programmed to act as a count signal generator and counter. A typical count cycle performed by the programmed micro-controller is:

| | | | |
|---|---|---|---|
| (a) | 0 | 0 | less than 10% - store a "rewound" bit in the E2PROM |
| (b) | 1 | 0 | more than 10%, less than 70% - do nothing |
| (c) | 1 | 1 | more than 70% - add a court to the total stored in E2PROM, if and only if, rewound bit has been set, then erase rewound bit from E2PROM memory |
| (d) | 1 | 0 | less than 70% - do nothing |
| (e) | 0 | 0 | return to (a) (record a "rewound" bit to indicate the start of another count cycle) |

The use of two radially spaced-apart sensors helps to insure valid counting; that is, to make sure that a count is not recorded when the program is only partially played, and that one count is recorded whenever at least 70% of the program has been played. The following examples show how the two sensors operate in conjunction with one another to achieve this end.

For example, assume that the tape from the rewound (less than 10%) position, plays forward to the position 10%, stops, rewinds to the 5% position, plays forward to the 70% position, plays back 10%, plays forward to the end of the program, and rewinds. This is, in effect, a single play. With two sensors and suitable logic this will create a single count. With only one sensor this might count two or three plays, depending on sensor position.

Even with a single forward play, as the tape roll slowly grows on the reel and slowly covers either sensor, there will be a period when that sensor's output is ambiguous. The ambiguity even could be worse if the recorder/player pauses at a marginal sensor position.

Two sensors and the above-described circuit and program prevent this ambiguity from causing a false reading.

An improved counting method is one in which the micro-controller is programmed so that it will recognize that the 70% sensor has been covered and a play has occurred if and only if the sensor has been covered for more than one sampling period; e.g., 3 successive periods of 2 to 3 minutes each, for a total of 6 to 9 minutes. This allows the user of the cassette to run the tape in the fast forward and fast rewind modes without creating a count. Since the 70% point is reached in most feature-length movies (e.g., 100 minutes long) well before the end, there is plenty of time before the end of the film for the count to be recorded.

Memory

The memory unit U2 is a non-volatile memory; that is, the data which is stored in it is retained indefinitely unless it is erased. It is called an "E2PROM" or an "EEPROM", which stands for "Electronically Erasable Programmable Read-only Memory". Accordingly, the data input and stored in the memory can be erased by the application of electric signals.

The memory U2 is used to hold the serial number of the cassette, the current cassette "count", and the serial number identifying the cassette, the program in the tape, etc.

The memory U2 also is used to store the status of the sensors S1 and S2 while the power is off. That is, the memory stores a digital 1 or 0 for each sensor to represent its logic state when the power is turned off. This information is used when the circuit next is energized to aid the micro-controller in deciding whether to do nothing, create and store a count, or to store a "rewound" bit in the memory U2.

A memory which has been used successfully in a circuit which has been built in accordance with the present invention is a NMC9306 256 bit sequential access memory. It is fabricated using advanced floating gate n-channel E2PROM technology.

The device contains 256 bits of read/write memory divided into 16 registers of 16 bits each. Each register can be serially read or written to by the micro-controller. Written information is stored in a floating gate cell which will retain the information for at least 10 years. The NMC9306 has been designed to meet applications requiring up to 10,000 erase-write cycles per register.

Data is stored in the memory U2 as follows:

| Register # | |
|---|---|
| 0 | four most significant binary-coded-decimal "(bcd)" digits of serial number |
| 1 | next four bcd digits of serial number |
| 2 | next four bcd digits of serial number |
| 3 | spare for future use. |
| 4–16 | play count and switch status |

Each of registers #4–16 holds a play count value and switch status. These registers are written cyclically with ascending counts as plays occur. The top bits of each register hold the previous sensor statii.

Registers are written into cyclically because each individual register is guaranteed for only 10,000 erase/- write cycles; cycling through all of the twelve registers in turn increases the total number of guaranteed erase-write cycles to 120,000.

The Micro-Controller and Internal Program

The preferred micro-controller is the model COP411C. It is a fully-static, single-chip micro-controller fabricated using double polysilicon-gate CMOS technology. This micro-controller contains all system timing, internal logic, ROM, RAM, and I/O (input/output circuitry) necessary to implement dedicated control functions. Its features include
Low power dissipation (40 uW).
Powerful instruction set.
512×8 bit ROM. 32×4 bit RAM.
16 I/O lines.
Two level subrouting stack.
DC to 4 usec instruction time.
Single supply operation (2.4 to 5.5 v).
Compatible serial I/O to E2PROM.
LSTTL/CMOS compability in and out.

When the micro-controller is turned on, either by the pressure switch SW1, or by the periodic timer, the internal program operates in the following matter:
Output a high signal to line G3 (pin 14) to hold the power on;
input data on lines LO.1.2, reading status of SW1 and tape sensors S1 and S2;
if SW1 is closed, go to [B]; otherwise;
parse through the registers in the E2PROM U2, determine the register containing the latest count, and check the previous sensor data versus the current sensor data. If there has been no sensor change, go to [C]. If there has been a sensor change, update the E2PROM to record this. If the sensor change indicates a completed 'play', increment the count and write the latest count and sensor data to the next cyclic location in the E2PROM;
go to [C].

[B]

Input the cassette serial number from the E2PROM;
convert each digit of this to a 3 of 9 bar-code pattern (see below) and transmit this pattern by outputing it in a timed serial manner to output line G1;
parse the E2PROM and find the most up-to-date count, convert this count to 3 of 9 bar-code pattern and output it to line G1; go to [C].

[C]

Output a low signal on line G3 to turn the power off.

Encoding

The micro-controller is programmed so as to convert signals read out of the memory U2 into signals which will simulate a bar-code being read by a wand. In order to understand this aspect of the invention, some discussion of bar-codes and the reading of bar-codes with wand readers now will be given.

In a bar-code such as the printed code pattern 344 shown in FIG. 22, data usually is stored in the form of a series of alternating dark and light lines and spaces. The codes usually are printed on a label or document.

There are many ways data can be encoded and formatted within a printed pattern. However, the preferred method chosen for use in the invention is the well-known 'standard 3 of 9 code' described below.

Standard 3 of 9 Code

This alphanumeric bar-code has characters consisting of 5 bars and 4 spaces for a total of 9 elements. 3 of these elements are wide, hence the name "3 of 9". Wide elements are equal to a binary one (1) and narrow elements are equal to a binary zero (0).

A specific ratio of the widths of the wide and narrow elements is used to distinguish the wide and narrow elements from one another. Depending on the resolution used, the wide element should be 2 to 3 times wider than the narrow element. All narrow elements should be of equal width, and all wide elements also should be equal in width.

The 3 of 9 code is a discrete code, meaning there is a space between each character. The width of this space is approximately equal to the width of the narrow element. This code is self-checking.

The Barcode Reading Operation

Referring again to FIG. 22, to read a bar-code with a wand such as the wand 342 (FIG. 22), the wand is placed on the paper at the white margin at either side of the bar-code symbol. The wand is then "whisked" smoothly and lightly through the entire printed pattern in the direction "W" without lifting it from the surface, as though lightly drawing a line through the bar-code with a pen.

When the wand is first placed on the paper, the light from the lamp 34 is reflected from the white surface and is sensed by the detector 348 in the wand, giving a logic low level output. As the wand is scanned across the bar-code, the output from the detector 348 goes high when there is little radiation reflected from the pattern due to passage of the wand over a dark bar or strip, and returns to a low level when the wand passes over a white space which reflects much more radiation back to the detector than the dark bar.

In this manner a bar-code is translated to a serial pulse train of high and low signal levels, the duration of each pulse representing the width of the code element.

Referring again to FIG. 20, when the wand is inserted into the reel hub, it is guided by the sloping surface 351 into alignment with the centerline 335 with its lens 341 near the LED 334. The outer surface of the LED is non-reflective so that the light from the emitter 347 in the wand is not reflected back to the photodetector 348. However, light from the LED 334 is transmitted directly through the tip of the wand onto the wand's detector 348.

As the wand 342 is pushed towards the LED 334, the wand tip closes the pressure switch 329 (SW1 in FIG. 21) which powers the micro-controller which then develops a pulse train representing the data to be read out and sends the pulses to the LED 334. The wand receives the optical pulses from the LED as if it were receiving reflected light from a bar-code pattern it is scanning. The pulses are timed by the micro-controller to match the pulses received from a printed bar-code when scanned at normal speeds. The scanning operation is further emulated by first turning on the LED 334 for a time before transmitting the pulses. This simulates exposure of the wand to a white margin next to a printed bar-code.

In encoding the signals, the standard 3 of 9 code is used.

The data transmitted consists of 18 digits:
1 start digit (*)

12 digits of unique cassette serial number
1 separator character (-)
3 digits of 'count' value
1 end digit (*).

Each digit is converted to a discrete 9 element code by the micro-processor prior to transmission.

Lamps and Sensors

The specific emitters LD2 and LD3 (FIG. 21) are PN gallium arsenide infrared emitting diodes capable of a continuous power output of 2.5 mW. Each produces a narrow spatial radiation pattern created by the lens 261 (FIG. 24) molded into its package. The wave length of its output is 940 nm.

The sensors S1 and S2 are opto-electronic switches providing light detection and low-level signal processing in a single 3-lead package. The monolithic integrated circuit requires no external components. Its high sensitivity makes it ideal for low level light detection.

Each opto-electronic switch includes a photo diode, a high-gain current amplifier, a comparator with 12% hysteresis, an output driver stage and a voltage regulator. The sensors turn on (produce an output signal) as illumination of the photo diode falls below 55 uW/CM$^2$ at 880 nm. An internal latch provides the hysteresis. The hysteresis insures that the output turns off when illumination surpasses the turn-on threshold by approximately 12%.

A number of different light emitting devices are suitable for use as the output LED 334. The device should be chosen as much for its power and physical size as for its output wavelength.

Though a emitter will output light of a very specific wavelength, the optical detector 348 (FIG. 22) in the wand 342 detects light across a fairly broad band.

The detector 348 gives its peak output when receiving radiation at approximately 820 nm. However, its 75% output is around 940 nm on the long side and 700 nm on the short side of peak output wavelength.

A switch emitter LD2 or LD3 is either a 930 nm PN Gallium Arsenide infrared-emitting diode or a 700 nm GaAsP red/infrared emitting diode.

VARIATIONS

There are a number of meritorious variations in the devices or their uses, in addition to the variations mentioned above.

For example, instead of using a light or other radiation emitter to simulate the reading of a bar-code, one can use a device such as a liquid crystal display ("LCD") to create an array of dark and light bars in a bar-code pattern. The array 228 in FIG. 16 can be considered to be such an array. Alternatively, one can use an LCD to create a single spot whose reflectivity varies with the signals in a pulse train to alternatingly simulate the dark and light lines or bars. This device 334 in FIGS. 17-20 can be considered to be such a LCD device. This makes use of the light emitter in the wand by sensing the reflection or lack of reflection of the signals emitted thereby, and can result in a reduction of battery drain and other advantages.

The principles of the invention also can be used to advantage in indicating and reading out from a tape reel or cassette other information regarding the tape such as the location in the tape at which information is being read. This can be done, for example, by providing a radial array of sensors such as sensors 324 and 326 (FIG. 18) and indicating which one is being covered by the tape roll. A single, elongated radial sensor in one flange and an opposed, elongated radial light emitter in the other flange can be used as an analog tape roll position indicator. The analog output of the sensor is proportional to the portion of its surface area which is illuminated. In either case, the signals are encoded and read out as described above.

Other switches can be used instead of the pressure switch 329. For example, in addition to the light-responsive switch mentioned above with respect to FIG. 16, a switch which operates in response to a change in capacitance caused by the bar-code reading wand coming near the LED 334. Such other switches have no moving parts. Thus it will be realized that the inventive means to automatically count the number of times that pre-recorded material has been played, or substantially played, may take several forms, as:

(a) sensing tape "play" tension against time;
(b) sensing spool rotation against time;
(c) sensing number of spool rotations electronically;
(d) sensing tape movement by capacitance against time; that is to say, footage played;
(e) sensing electromagnetic radiation of player against time.

There again, change in diameter of a tape reel may equally well be sensed optically, magnetically, by capacitance, etc.

It is further contemplated that the present invention will actively encourage all distributors to ensure that all video copies of new films and all new copies of old films are made on cassettes with built-in counters, as such is very much in their own interests. There again, purchasers of new cassettes, whether pre-recorded or blank, may well regard a counter as a desirable "extra", enabling them to keep track of tape and/or head wear.

Installation of the inventive counters will permit all supplies of new and replacement cassettes to be based on fee-per-use contracts, thus making the proposition highly attractive to video shop operators by substantially reducing their initial outlay and so allowing them to carry more copies of successful films and a greater variety of films in general.

It is envisaged that the first application of this invention will be to the licensing for use and renting of video cassettes, but that subsequent applications will include all electronic, electromagnetic and light-spectrum recording media.

Although this invention has been described above with reference to video cassettes, the principles thereof are equally applicable to audio cassettes and cartridges and the like.

From the above-going, those skilled in the art will readily appreciate that video cassettes incorporating counting devices according to the present invention will provide the public with a new or much-improved article or, at the very least, offer to it a useful and attractive choice.

Although the invention has been described above with reference to examples and to preferred embodiments, it will be appreciated that the invention may be embodied in other forms or carried out in other ways without departing from the spirit or essential characteristics thereof. The above description is therefore to be considered in all respects, illustrative and not restrictive, and all changes which come within the meaning and range of equivalency are intended to be embraced therein.

I claim:

1. Apparatus for providing an electronic read-out of information stored in a portable video cassette housing for housing a movable record member for recording or playing back recorded information, said apparatus comprising, in combination, means for movably supporting said record member in said housing, encoding means in said housing for encoding said information into a coded form consisting of electrical signals for producing corresponding coded optical signals, said housing having access means to permit detection of said optical signals from outside of said housing by an optical code detection device.

2. Apparatus as in claim 1 in which said optical means comprises means for changing the reflectivity of a surface in response to said electrical signals.

3. Apparatus as in claim 1 including a micro-controller programmed for use as said encoding means.

4. Apparatus as in claim 1, in which said information stored in said housing identifies the record housed therein.

5. Apparatus as in claim 1, in which said info ration indicates the amount said record has been played.

6. Apparatus as in claim 1, in which said housing is a tape cassette.

7. Apparatus as in claim 1, in which said housing is adapted to be inserted into a recording or playback unit to bring said record into recording or playback position in said unit.

8. Apparatus as in claim 1, in which said encoding means is adapted to encode said optical signals to simulate the scanning of a bar code with said detection device.

9. Apparatus as in claim 1 including a storage battery in said housing for powering said apparatus, and externally operable switching means in said housing for enabling said optical means, and in which said optical means is adapted to be operable only in response to the operation of said externally operable switching means.

10. Apparatus as in claim 9, including positioning means engageable by said optical code detection device for positioning said detection device to receive said optical signals, said switching means being operably coupled to said positioning means.

11. Apparatus for providing an electronic read-out of information stored in a record housing, said apparatus comprising, in combination, encoding means in said housing for encoding said information into a coded form consisting of electrical signals; optical means responsive to said electrical signals for producing corresponding coded optical signals, said housing having access means to permit detection of said optical signals from outside of said housing by an optical code detection device, in which said housing is a video tape cassette which contains video tape and at least one tape reel to wind said video tape on, detecting means for detecting each time when the tape has been placed for substantially one full play of a program recorded on said tape and creating a corresponding output signal, means in said cassette for counting and storing said output signals over a period of time, and delivering a signal representing the total count to said encoding means.

12. Apparatus as in claim 11 in which said detecting means includes at least one sensor having a radiation emitter and at least one radiation-responsive detector mounted within said tape reel to detect filling or emptying of the tape reel to a predetermined point, said radiation emitter and said detector being relatively flat, thin, planar devices mounted side-by-side in one of the flanges of said tape reel, whereby said detector detects light reflected from the other flange of said tape reel when it is not covered by a tape roll.

13. Apparatus as in claim 11 including a battery in said housing for energizing said detecting means and means for periodically connecting said detecting means to said battery for only relatively short time intervals, with relatively long time periods between said intervals.

14. Apparatus as in claim 11 including a battery and means for intermittently connecting said counting means to be energized by said battery, said storing means comprising non-volatile memory means.

15. Apparatus for providing an electronic read-out of information stored in a record housing, said apparatus comprising, in combination, encoding means in said housing for encoding said information into a coded form consisting of electrical signals; optical means responsive to said electrical signals for producing corresponding coded optical signals, said housing having access means to permit detection of said optical signals from outside of said housing by an optical code detection device, in which said housing is a tape cassette with a tape reel having a drive hub with a drive socket, in which said optical means is located at the center of said hub, said access means being located in said drive socket so as to be accessible to a code-reading probe from outside of said cassette.

16. Apparatus for providing an electronic read-out of information stored in a record housing, said apparatus comprising, in combination, encoding means in said housing for encoding said information into a coded form consisting of electrical signals; optical means responsive to said electrical signals for producing corresponding coded optical signals, said housing having access means to permit detection of said optical signals from outside of said housing by an optical code detection device, in which said electrical signals are formed into a series of pulses, said optical means being adapted to produce pulses of optical radiation from a single source and simulate a bar-code when read by a bar-code scanner, and said optical code detection device is a bar-code scanner.

17. Apparatus as in claim 16 in which said source is a LED lamp, and said bar-code scanner is connected to a computer.

18. Apparatus for providing an electronic read-out of information stored in a record housing, said apparatus comprising, in combination, encoding means in said housing for encoding said information into a coded form consisting of electrical signals; optical means responsive to said electrical signals for producing corresponding coded optical signals, said housing having access means to permit detection of said optical signals from outside of said housing by an optical code detection device, in which said optical means comprises means for changing the reflectivity of a surface in response to said electrical signals, in which said optical means comprises a liquid crystal display device adapted to produce a display selected from the group consisting of an array comprising a bar code capable of being scanned by a bar-code scanner, and a single spot capable of changing its reflectivity in response to a series of times signals so as to simulate a bar code to a stationary bar-code scanner.

* * * * *